US012769037B2

(12) United States Patent
Izumidate

(10) Patent No.: US 12,769,037 B2
(45) Date of Patent: Oct. 20, 2026

(54) LOUVER, HEAD MOUNTED DISPLAY, AND OPTICAL DEVICE

(71) Applicant: CANON KABUSHIKI KAISHA, Tokyo (JP)

(72) Inventor: Koujirou Izumidate, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 18/539,859

(22) Filed: Dec. 14, 2023

(65) Prior Publication Data

US 2024/0210603 A1 Jun. 27, 2024

(30) Foreign Application Priority Data

Dec. 22, 2022 (JP) ................................ 2022-205018

(51) Int. Cl.
*G02B 5/00* (2006.01)

(52) U.S. Cl.
CPC ........ *G02B 5/005* (2013.01); *G02B 2207/123* (2013.01)

(58) Field of Classification Search
None
See application file for complete search history.

(56) References Cited

U.S. PATENT DOCUMENTS 7,530,719 B2 * 5/2009 Yamashita ............. G02B 5/045 362/626
2011/0128470 A1 * 6/2011 Yorita .................... B60K 37/00 359/613
2015/0253576 A1 9/2015 Sugihara
2016/0018571 A1 * 1/2016 Kusama ............... G02B 5/0257 252/582
2016/0341383 A1 * 11/2016 Gardiner ................ F21S 11/007
2020/0183153 A1 * 6/2020 Tam ................... G02B 27/0172
2020/0264378 A1 * 8/2020 Grant ................. G02B 27/0103
2021/0405376 A1 12/2021 Oka
2022/0171198 A1 6/2022 Shishido
2022/0299774 A1 9/2022 Tatsumi

FOREIGN PATENT DOCUMENTS

JP H11-095160 A 4/1999
JP 2020-160424 A 10/2020
JP 2021-063934 A 4/2021

* cited by examiner

*Primary Examiner* — Sharrief I Broome
*Assistant Examiner* — Journey F Sumlar
(74) *Attorney, Agent, or Firm* — Venable LLP

(57) ABSTRACT

A plate-shaped louver includes an incident surface on which light is incident from an optical element and an emission surface. The louver includes a plate-shaped base portion made of a light transmitting material and a light shielding portion arranged in contact with the light transmitting material inside the base portion. The light shielding portion includes a second surface and a first surface, the second surface being a surface on a side close to an outer edge of the plate-shaped base portion among surfaces of the light shielding portion, the first surface being a surface on an opposite side of the second surface. The light shielding portion includes an inclined portion in which the second surface is inclined with respect to the first surface. A thickness of the inclined portion is configured to increase from a side of the incident surface toward a side of the emission surface.

15 Claims, 20 Drawing Sheets

FIG.14

| | Ra OUTSIDE OPTICAL AXIS (nm) | LOUVER SHAPE | INCLINATION THICKNESS INCREASING DIRECTION | NUMBER OF INCLINATIONS | INCLINATION ANGLE (°) | | INCLINATION THICKNESS μm | LIGHT SHIELDING FILM THICKNESS μm | INCLINATION WIDTH (μm) | | FLAT PORTION LENGTH (mm) | OPTICAL AXIS DIRECTION LENGTH OF LIGHT SHIELDING PORTION (mm) | LOUVER CENTER - EYE LENGTH (mm) | LIGHT SHIELDING PORTION INTERVAL (mm) | REFLECTION OF DISPLAY LIGHT ON OUTER SIDE OF OPTICAL AXIS | REFLECTION/SCATTERING OF EXTERNAL LIGHT/STRAY LIGHT |
|---|---|---|---|---|---|---|---|---|---|---|---|---|---|---|---|---|
| | | | | | FIRST INCLINATION | SECOND AND SUBSEQUENT INCLINATIONS | | | FIRST INCLINATION | SECOND AND SUBSEQUENT INCLINATIONS | | | | | | |
| EXAMPLE 1 | 8 | ANNULAR SHAPE | + | 1 | 3.8 | NONE | 44.9 | 45 | 676 | NONE | NONE | 0.676 | 30 | 1 | A | A |
| EXAMPLE 2 | 18 | ANNULAR SHAPE | + | 1 | 3.8 | NONE | 44.9 | 45 | 676 | NONE | 0.324 | 1.000 | 30 | 1 | A | A |
| EXAMPLE 3 | 8 | ANNULAR SHAPE | + | 15 | 12.8 | 18.5 | 43.9 | 44 | 193 | 131 | NONE | 2.027 | 5 | 1 | A | A |
| EXAMPLE 4 | 18 | ANNULAR SHAPE | + | 340 | 15.4 | 23.3 | 2 | 2.1 | 7 | 5 | NONE | 1.702 | 5 | 2 | A | A |
| EXAMPLE 5 | 8 | STRAIGHT LINE | + | 15 | 12.8 | 18.5 | 43.9 | 44 | 193 | 131 | NONE | 2.027 | 5 | 1 | A | A |
| EXAMPLE 6 | 100 | ANNULAR SHAPE | + | 15 | 12.8 | 18.5 | 43.9 | 44 | 193 | 131 | NONE | 2.027 | 5 | 1 | A | A |
| COMPARATIVE EXAMPLE 1 | 100 | ANNULAR SHAPE | — | 1 | 3.8 | NONE | 44.9 | 45 | 676 | NONE | 0.324 | 1.000 | 30 | 1 | B | B |
| COMPARATIVE EXAMPLE 2 | 8 | ANNULAR SHAPE | — | 15 | 12.8 | 18.5 | 43.9 | 45 | 193 | 131 | NONE | 2.027 | 5 | 1 | B | B |

PRIOR ART

LOUVER, HEAD MOUNTED DISPLAY, AND OPTICAL DEVICE

BACKGROUND OF THE INVENTION

Field of the Invention

The present invention relates to a head-mounted display, a louver used for an optical device such as a head-mounted display, a manufacturing method thereof, and the like.

Description of the Related Art

In recent years, head-mounted displays are used in various fields including virtual reality. The head-mounted display is superior to a direct-view flat panel display or a projection-type projection display in that a video viewed from any direction can be displayed, or a video can be superimposed and displayed on an external image viewed from a position of a user.

As schematically illustrated in FIG. 16, the head-mounted display includes a display panel 21 that displays a video, and an optical element 22 that focusing display light IMG displayed on the display panel 21 near the position of an eye 24 of the user. Note that FIG. 16 is merely a conceptual schematic diagram, an optical path changing element such as a mirror or PBS may be provided between the display panel 21 and the eye 24 of the user, and the display panel 21 and the optical element 22 may be laid out at different positions. In addition, the optical element 22 may be a transmission optical element such as a convex lens, a reflection optical element such as a concave mirror, or a plurality of combinations thereof.

For convenience of user visibility, it has been proposed to provide a louver in a casing of a head-mounted display.

In JP H11-95160 A, in a head-mounted display including a combiner that synthesizes external light from the front with display light of a display image, it is proposed to provide a louver having a light shielding property to the combiner.

JP 2020-160424 A discloses a technique of roughening both front and back surfaces of a light shielding portion of a louver in order to suppress a ghost in which video light is doubled.

In order to provide an easily viewable image in the head-mounted display, it is necessary to propagate the display light from the display panel to the eye of the user as uniformly as possible and to prevent the external light 25 and the stray light in the head-mounted display from entering the eye of the user as much as possible.

However, it is difficult to sufficiently achieve these in the head-mounted displays disclosed in JP H11-95160 A and JP 2020-160424 A.

SUMMARY OF THE INVENTION

According to a first aspect of the present invention, a plate-shaped louver includes an incident surface on which light is incident from an optical element and an emission surface. The louver includes a plate-shaped base portion made of a light transmitting material and a light shielding portion arranged in contact with the light transmitting material inside the base portion. The light shielding portion includes a second surface and a first surface, the second surface being a surface on a side close to an outer edge of the plate-shaped base portion among surfaces of the light shielding portion, the first surface being a surface on an opposite side of the second surface. The light shielding portion includes an inclined portion in which the second surface is inclined with respect to the first surface. A thickness of the inclined portion is configured to increase from a side of the incident surface toward a side of the emission surface.

According to a second aspect of the present invention, a head-mounted display includes a display unit configured to display an image, an optical element configured to focus the image toward a position of an eye of a user, and a plate-shaped louver arranged between the optical element and the position of the eye of the user and including an incident surface on which light is incident from the optical element and an emission surface. The louver includes a plate-shaped base portion made of a light transmitting material and a light shielding portion arranged in contact with the light transmitting material inside the base portion. The light shielding portion includes a second surface and a first surface, the first surface being a surface on a side close to an optical axis of the optical element, the second surface being a surface on an opposite side of the first surface. The light shielding portion includes an inclined portion in which the second surface is inclined with respect to the optical axis of the optical element. A thickness of the inclined portion increases from a side of the incident surface toward a side of the emission surface.

Further features of the present invention will become apparent from the following description of exemplary embodiments with reference to the attached drawings.

BRIEF DESCRIPTION OF THE DRAWINGS

FIG. 14 is a table collectively illustrating specifications of examples and comparative examples.

DESCRIPTION OF THE EMBODIMENTS

Figure 1:
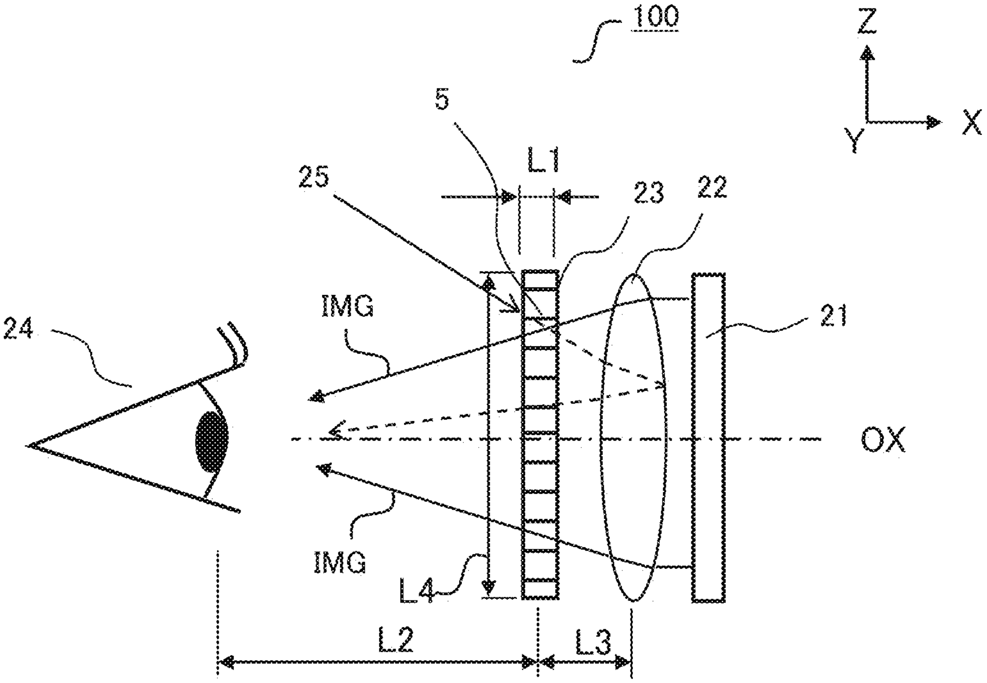
FIG. 1 is a schematic diagram illustrating a configuration of an optical system of a head-mounted display according to a first embodiment.

A louver, a head-mounted display, and the like according to embodiments of the present disclosure are described with reference to the drawings. The embodiments and examples described below are examples, and detailed configurations can be appropriately changed and implemented by those skilled in the art without departing from the gist of the present disclosure.

Further, in the drawings referred to in the following description of the embodiments and examples, elements denoted by the same reference numerals have the same functions unless otherwise specified. In the drawings, in a case where a plurality of the same elements is arranged, reference numerals and description thereof may be omitted.

In addition, since the drawings may be schematically represented for convenience of illustration and description, shapes, sizes, arrangements, and the like of elements described in the drawings may not strictly coincide with actual objects. In addition, "XX or more and YY or less" or "XX to YY" representing a numerical range means a numerical range including end points XX (lower limit) and YY (upper limit) unless otherwise specified. In a case where numerical ranges are described in multiple hierarchies, the upper limit and the lower limit of each numerical range can be freely and selectively combined.

In the following description, for example, an X positive direction indicates the same direction as that indicated by the X-axis arrow in the illustrated coordinate system, and an X negative direction indicates a direction 180 degrees opposite to that indicated by the X-axis arrow in the illustrated coordinate system. In addition, in case of being simply referred to as an X direction, it is assumed that the direction is parallel to the X axis regardless of the difference from the direction indicated by the illustrated X-axis arrow. The same applies to directions other than X.

First Embodiment

Optical System of Head-Mounted Display

FIG. 1 is a schematic diagram illustrating a configuration of an optical system of a head-mounted display 100 according to an embodiment. Note that, since FIG. 1 is a schematic diagram for showing arrangement of the optical system, a casing, a mounting tool to be mounted on a head of a user, a communication unit for communicating video information, a power supply unit, and the like are omitted.

Reference numeral 21 denotes a display panel as a display unit, reference numeral 22 denotes an optical element as an optical unit, reference numeral 23 denotes a louver, and reference numeral 24 denotes an eye of a user. The head-mounted display 100 is provided with an optical system including units respectively for a right eye and a left eye, and a video for the right eye is displayed on a display panel of the unit for the right eye, and a video for the left eye is displayed on a display panel of the unit for the left eye. FIG. 1 illustrates one unit of the optical system for the right eye or an optical system for the left eye. Specifically, the display panel 21 is, for example, an organic EL panel or a liquid crystal panel.

The optical element 22 serving as an optical unit is an optical element that directs display light IMG emitted from the display panel 21 toward the eye of the user and focuses the display light IMG near a position of the eye of the user and causes the user to recognize an image displayed on the display panel 21 as an enlarged image with a clear viewing distance. The optical element 22 is arranged in the middle of an optical path of the display light IMG from the display panel 21 to the position of the eye 24 of the user and an optical axis OX thereof is arranged to connect the screen center of the display panel 21 and the eye of the user. The optical element 22 is typically a convex single lens but may be a lens system in which a plurality of lenses is combined so as to have positive power as a whole. The optical element 22 constituting the lens system may include an optical element that does not have a focusing function and, for example, may include an optical element that has a function of efficiently causing light from the entire display panel 21 to be incident to the eye of the user.

The louver 23 (louver element) is a plate-shaped member arranged in an optical path space occupied by the optical path of the display light IMG from the optical element 22 toward the eye of the user. In other words, the louver 23 is arranged in the optical path of the display light IMG from the optical unit that directs the display light output from the display panel to the eye of the user toward the eye of the user.

The louver 23 includes a plurality of light shielding portions 5 therein. As described below with reference to FIG. 3B, the plurality of light shielding portions 5 of the louver 23 are provided along a plurality of concentric circles having different diameters in case of being viewed from the direction of the optical axis OX of the optical element 22. The louver 23 is arranged such that the center of this concentric circle is positioned on the optical axis OX of the optical element 22. Here, the length of the louver 23 in case of being viewed along the optical axis OX is set as L1. Also, in case of being viewed along the optical axis OX, the distance from the position of the eye of the user to the center of the louver 23 is set as L2, and the distance from the center of the louver 23 to the center of the optical element 22 is set as L3. Note that the center of the louver 23 refers to the center of the light shielding portions 5 in case of being viewed along the optical axis OX. L1 is preferably set within a range of 0.3 mm to 3 mm, L2 is preferably set within a range of 30 mm or less, and L3 is preferably set within a range of 5 mm to 25 mm. In addition, if the length of the louver 23 in the vertical direction (Z direction) is set as LA, LA is set to a length that can cover the cross section of the optical path of the display light IMG from the optical element 22 toward the eye of the user.

The light shielding portion 5 is arranged in a position and orientation so as to transmit most of the display light IMG from the optical element 22 toward the eye 24 of the user while shielding external light 25 toward the optical element 22. The external light 25 indicated by a solid line in FIG. 1 reaches the light shielding portion 5 of the louver 23 but is shielded there. Therefore, the external light does not pass through the optical path indicated by a dotted line and is greatly suppressed from reaching the eye 24 of the user as an external light ghost.

Figure 2:
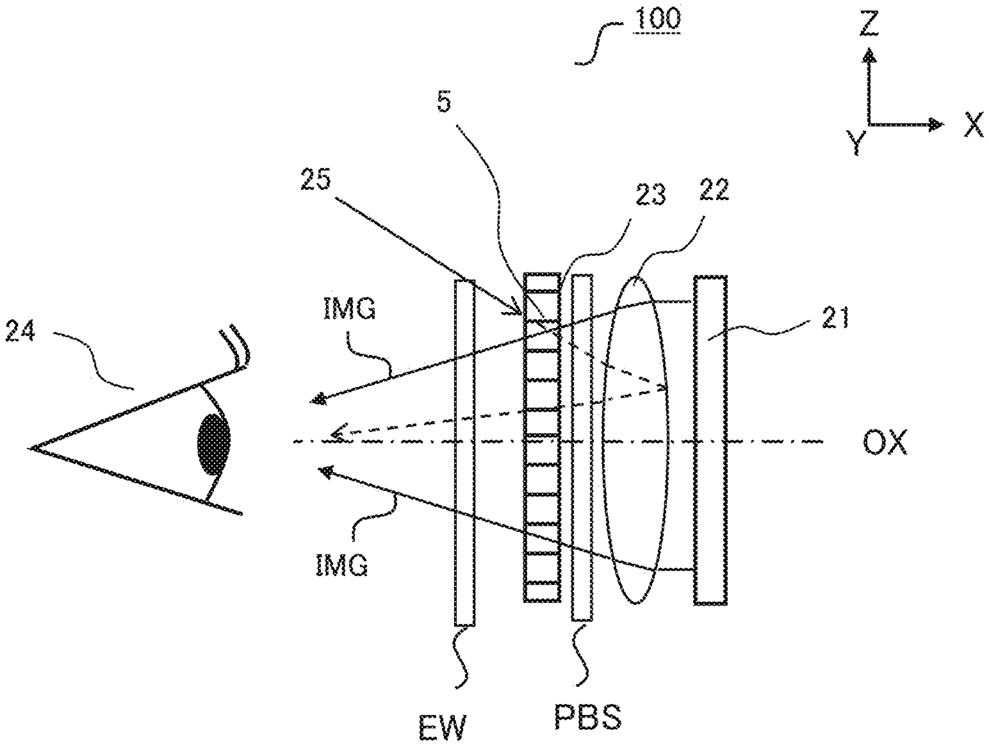
FIG. 2 is a schematic diagram illustrating a configuration of an optical system of a head-mounted display according to a modification of the first embodiment.

Note that the head-mounted display 100 may further include an optical element. For example, as illustrated in FIG. 2, a polarization beam splitter PBS may be provided between the optical element 22 and the louver 23. Otherwise, a window member EW (transparent plate member) for protecting the inside of the device from dust or the like may be provided between positions of the louver 23 and the eye 24 of the user. In such a case, the louver 23 according to the embodiment is arranged in an optical path space occupied by the optical path of the display light IMG from the optical element 22 toward the eye of the user.

Figure 4:
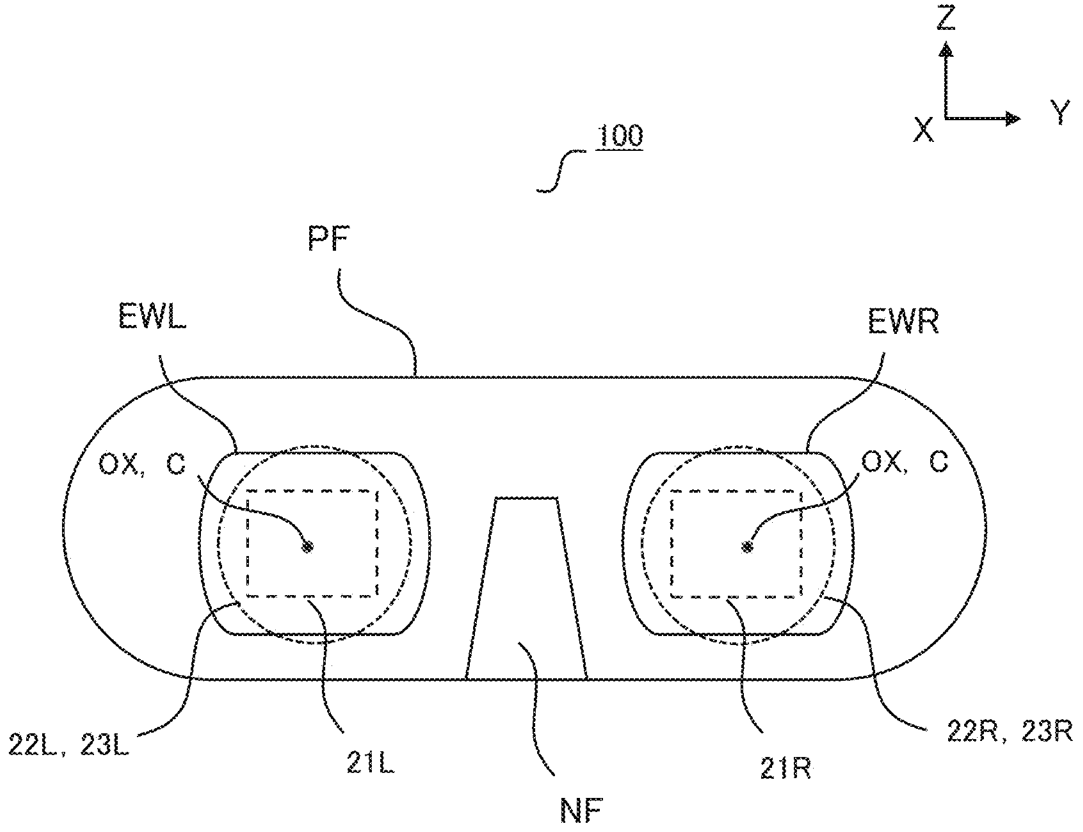
FIG. 4 is a plan view of the head-mounted display according to the first embodiment in case of being viewed from the user side.

FIG. 4 is a plan view of the head-mounted display 100 according to the embodiment in case of being viewed from the user side. Note that, since FIG. 4 is a schematic diagram for showing arrangement of the optical system, a mounting tool for mounting the head-mounted display 100 on the head of the user, a communication unit for communicating video information, a power supply unit, and the like are omitted.

The PF is a frame (frame portion) made of a light shielding material, and functions as a casing that supports the display panel and the optical member, and is also a cover that shields external light from the front direction. The frame PF is provided with a nose pad portion NF for positioning on the face of the user. A window member EWR, a louver 23R, an optical system 22R, and a display panel 21R are arranged in order from the face side of the user as elements for the right eye, and a window member EWL, a louver 23L, an optical system 22L, and a display panel 21L are provided in order from the face side of the user as elements for the left eye. As in the example illustrated in FIG. 1, if the louver 23 also serves as a window member for protecting the inside of the device from dust or the like, the window member EWR and the window member EWL may not be provided.

As the display panel 21R and the display panel 21L, display panels, for example, having a screen aspect ratio of 4:3 or 16:9 are suitably used, but the present disclosure is not limited thereto. The screen center of each display panel, the optical axis OX of each focusing optical system, and a center line C of each louver are arranged so as to overlap each other in plan view from the user side. However, in order to cause congestion, the screen center of each display panel, the optical axis OX of each focusing optical system, and the center line C of each louver may be slightly shifted.

In addition, as illustrated in FIG. 4, by making the outer shape of the louver substantially the same as the outer shape of the focusing optical system (for example, the outer shape of the convex lens or the concave mirror), the utilization efficiency of the display light and the shielding of the external light can be balanced at a high level.

Louver

Figure 3A:
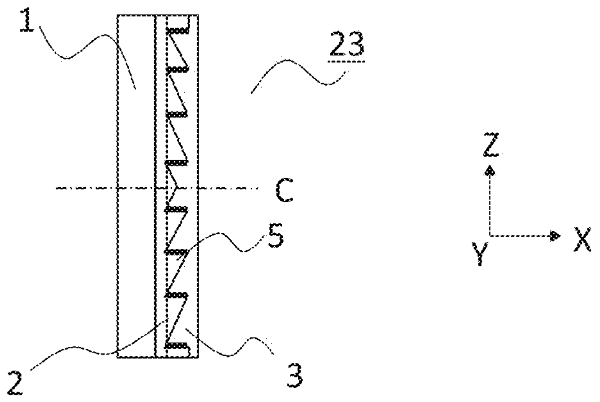
FIG. 3A is a schematic cross-sectional view illustrating a cross section of a plate-shaped louver 23 cut in a direction perpendicular to a main surface.
Figure 3B:
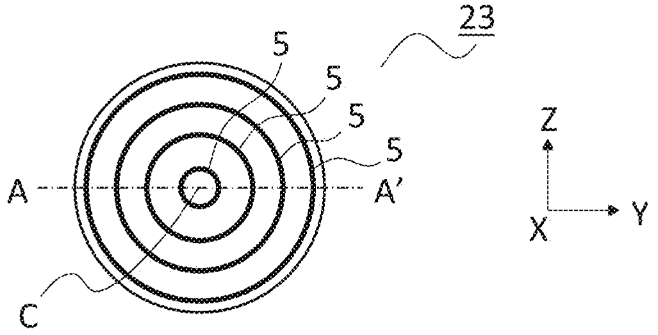
FIG. 3B is a plan view of the main surface of the louver 23 as viewed from the direction of an optical axis OX.

Next, the louver 23 (louver element) is described in detail with reference to the drawings. FIG. 3A is a schematic cross-sectional view illustrating a cross section of the plate-shaped louver 23 cut in a direction perpendicular to the main surface, and FIG. 3B is a plan view of the main surface of the plate-shaped louver 23 viewed from the direction of the optical axis OX in FIG. 1. The cross-sectional view of FIG. 3A shows a cross section taken along line A-A' in FIG. 3B. In order to illustrate the correspondence with the installation posture when the louver 23 is installed in the head-mounted display, each drawing illustrates a coordinate system corresponding to the XYZ coordinate system illustrated in FIG. 1. Therefore, in the louver 23 illustrated in FIG. 3A, the surface on the rightmost side (the plus side in the X direction) is an incident surface on which the light is incident from the optical element, and the surface on the leftmost side (the negative side in the X direction) is an emission surface from which the display light is emitted toward the eye of the user.

A line that passes through the center point of the louver 23 in plan view and is perpendicular to the main surface is referred to as a center line C and is indicated by an alternate long and short dash line in FIG. 3A. If the louver 23 is mounted on the head-mounted display, the louver 23 is arranged such that the center line C substantially coincides with the optical axis OX of the optical element 22.

The louver 23, which is a plate-shaped optical element as a whole, is an optical element in which a substrate 1 made of a light transmitting material, a first base portion 2 made of a light transmitting resin material, a second base portion 3 made of a light transmitting resin material, and a light shielding portion 5 made of a light shielding material are integrated. Note that, in the following description, the first base portion 2, the second base portion 3, and the light shielding portion 5 may be collectively referred to as a louver body. In addition, the first base portion 2 and the second base portion 3 may be collectively referred to simply as a base portion (or a plate-shaped base portion).

In the embodiment illustrated in FIG. 3A, the louver 23 includes the substrate 1. However, in a case where sufficient mechanical strength is secured only by the louver body, the substrate 1 may be omitted, and the louver 23 may be configured only with the first base portion 2, the second base portion 3, and the light shielding portion 5. Conversely, in a case where it is desired to more firmly protect the louver body, the substrates 1 may be provided not only on the side of the first base portion 2 but also on the side of the second base portion 3, and the louver body may be sandwiched between two substrates 1.

Hereinafter, the substrate and the louver body are sequentially described, and subsequently, the light shielding portion which is a feature of the present embodiment are described in detail.

Substrate

As the substrate 1, any one of a glass material and an optical resin material can be used as long as desired optical characteristics such as transparency are satisfied. In a case where emphasis is placed on the viewpoint that characteristic fluctuation is unlikely to occur (reliability and durability), a glass material is suitable. For example, various types of glass such as general optical glass represented by silicate glass, borosilicate glass, and phosphate glass, quartz glass, and glass ceramic can be used. Meanwhile, in a case where emphasis is placed on cost reduction and weight reduction, it is preferable to use a resin, and examples thereof include resins such as a thermoplastic resin, a thermosetting resin, an ultraviolet curable resin, and a two-liquid curable resin. Examples of the thermoplastic resin include polymethyl methacrylate (PMMA), polycarbonate, polystyrene, an MS resin, an AS resin, polyolefin such as polyethylene and polypropylene, polyester such as polyethylene terephthalate and polybutylene terephthalate, polyvinyl chloride, cellulose acylate, a thermoplastic elastomer, and a cycloolefin polymer. Examples of the thermosetting resin include a phenol resin. These resins may be used alone or in combination of two or more thereof. Note that the substrate 1 can be manufactured by, for example, a thermal imprinting method, an optical imprinting method, extrusion molding, or injection molding. The shape of the main surface of the substrate 1 in a cross-sectional view is not necessarily limited to the flat surface as illustrated in FIG. 3A and can be selected, for example, from a concave spherical surface, a convex spherical surface, and an axisymmetric aspherical surface. In addition, the outer shape of the substrate 1 in a plan view from the direction perpendicular to the main surface (the direction along the center line C) can be various shapes but can be selected from a circle, a quadrangle, and the like.

Louver Body

The louver body includes the first base portion 2, the second base portion 3, and the light shielding portion 5.

As illustrated in FIG. 3A, regarding the first base portion 2, the main surface that becomes the emission side (the eye side of the user) of the display light IMG in case of being assembled to the head-mounted display is a flat surface. In addition, the main surface (the surface facing the second base portion 3) that becomes the incident side of the display light IMG has a concave and convex portion. In addition, regarding the second base portion 3, the main surface (the side of the optical element 22) that becomes the incident side of the display light IMG in case of being assembled to the head-mounted display is a flat surface, and the main surface (the surface facing the first base portion 2) that becomes the emission side of the display light IMG has a concave and convex portion.

Note that, in a case where a substrate of which a main surface shape in a cross-sectional view is not flat is used as the substrate 1, the flat surfaces of the first base portion 2 and the second base portion 3 described above have shapes (non-flat surfaces) following the main surface shape of the substrate 1.

Note that the concave and convex portion of the first base portion 2 and the concave and convex portion of the second base portion 3 are fitted to or in contact with each other, and the first base portion 2 and the second base portion 3 are integrated. The first base portion 2 and the second base portion 3 are made of a material having substantially the same refractive index and are preferably formed of the same type of resin material. The resin material for forming the base portions is not particularly limited, as long as the resin material satisfies optical characteristics such as transmittance and reliability. However, a photosensitive resin material is suitably used for manufacturing easiness. Specifically, an acrylate-based resin, a polycarbonate resin, and the like are suitably used. In order to achieve predetermined optical characteristics, inorganic fine particles can be internally added to the optical resin material. The inorganic fine particles to be added are selected according to required optical characteristics. Specific examples thereof include zirconia oxide, titanium oxide, zinc oxide, indium oxide, tin oxide, antimony oxide, indium tin oxide (ITO), tin oxide doped with antimony (ATO), and indium oxide doped with zinc (IZO).

The concave and convex portions included in the first base portion 2 and the second base portion 3 may be any object that can be fitted to or in contact with each other and can form the light shielding portion 5 at a predetermined position, in a predetermined direction, and in a predetermined shape as described below. As illustrated in FIG. 3A, a sawtooth shape in which triangles are arranged is suitably used as the cross-sectional shape of the concave and convex portion, but other shapes may be used. Examples thereof include a cross-sectional shape in which a triangle such as an isosceles triangle and a right triangle, a quadrangle, a trapezoid, a semicircle, and the like are continuously arranged. In case of being viewed in a plan view in the direction of the optical axis OX in FIG. 1, the concave and convex portion is formed along a plurality of concentric circles having different diameters.

In a case where a portion in which the first base portion 2 and the second base portion 3 are fitted to or in contact with each other is viewed in the Z direction, it can be seen that portions in which the first base portion 2 and the second base portion 3 are in contact with each other and portions 4 in which the first base portion 2 and the second base portion 3 sandwich the light shielding portion 5 are alternately arranged. In case of being viewed in the Z direction, it may be said that the base portions made of a transparent resin material and the light shielding portions are alternately arranged. Note that the Z direction here can also be referred to as a direction parallel to the main surface of the plate-shaped louver, a direction orthogonal to the center line C, or a vertical direction.

Figure 5:
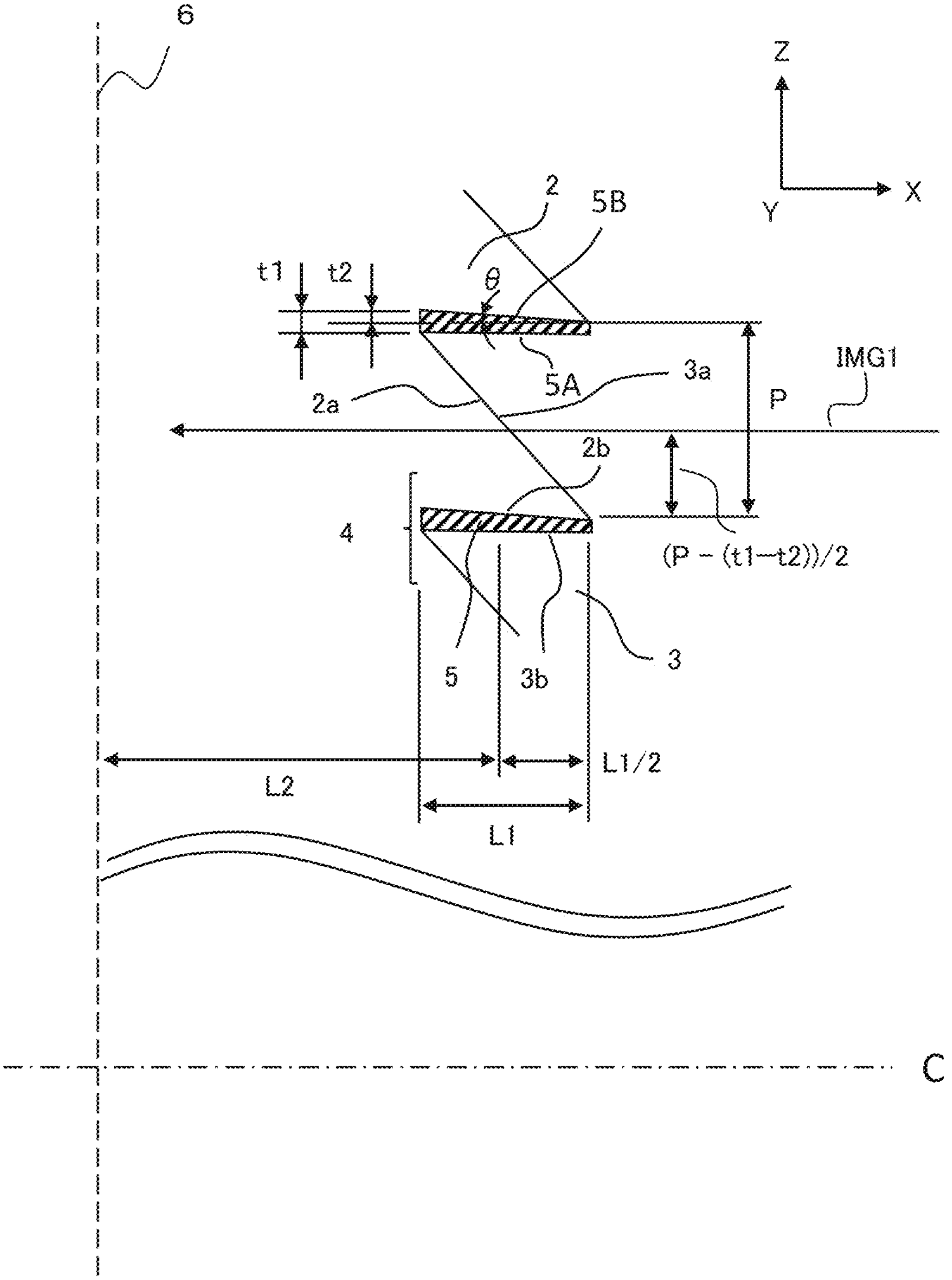
FIG. 5 is an enlarged cross-sectional view of a part of the louver.

FIG. 5 illustrates a cross-sectional view obtained by extracting and enlarging a part of FIG. 3A. A broken line 6 in the drawing indicates the position of the pupil of the user in the direction (X direction) of the optical axis OX of the optical element 22. Since an interface where a 2*a* surface of the first base portion 2 and a 3*a* surface of the second base portion 3 are in contact with each other is an interface where the same materials are in contact with each other, the interface does not act optically, and this portion serves as a window through which the display light IMG is transmitted. The light shielding portion 5 is sandwiched between a 2*b* surface of the first base portion 2 and a 3*b* surface of the second base portion 3. In case of being viewed in a plan view in the direction of the optical axis OX in FIG. 1, the light shielding portion 5 is formed in a plurality of concentric circles having different diameters as illustrated in FIG. 3B. Here, FIG. 3A corresponds to a cross section taken along line A-A' of FIG. 3B. As illustrated in FIG. 1, the light shielding portion 5 is provided at a position and in a direction where the external light 25 directed to the optical element 22 is effectively shielded but the display light IMG directed from the optical element 22 to the eye 24 of the user is hardly shielded.

Figure 3C:
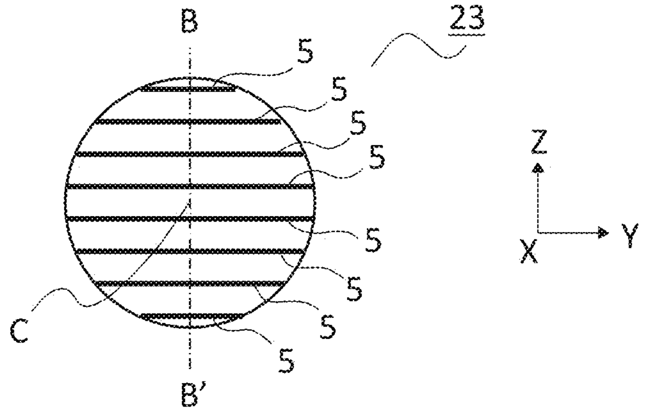
FIG. 3C is a plan view of the main surface of the louver 23 according to the modification as viewed from the direction of an optical axis OX.

Note that, in the present embodiment, the shape of the light shielding portion 5 in a plan view is not limited to the plurality of concentric circles illustrated in FIG. 3B and may be, for example, a stripe shape as illustrated in FIG. 3C. In this case, FIG. 3A corresponds to a cross section taken along line B-B' in FIG. 3C.

As illustrated in FIG. 3A, in the louver 23 of the present embodiment, a plurality of light shielding portions 5 are provided at intervals along a vertical direction (Z direction) orthogonal to the optical axis OX of the optical element 22. As illustrated in FIG. 3A, the louver 23 of the present embodiment has a vertically symmetrical structure with respect to the center line C in case of being viewed along the vertical direction (Z direction) orthogonal to the direction (Y direction) connecting the left and right eyes of the user.

In a case where the louver 23 is mounted on the head-mounted display, the center line C is arranged to substantially coincide with the optical axis of the optical unit, that is, the optical axis OX of the optical element 22 illustrated in FIG. 1. In other words, the center of the plurality of concentric circles or the centers of the plurality of stripes that configure the light shielding portion 5 are arranged on a line connecting the screen center of the display panel 21 and the position of the eye 24 of the user. In a case where the concentric light shielding portion is adopted, there is an advantage that brightness uniformity of the display image is excellent. In addition, if the louver is formed by molding or using a dispenser, for example, stress acts isotropically, so that distortion is small. If the substrate is rotated, there is also an advantage that the light shielding material can be easily applied. Therefore, the manufacturing is easy.

As illustrated in FIG. 5, in a case where an interval between the light shielding portions (difference in radius between adjacent concentric circles or interval between stripes) is set as P, and a maximum thickness of the light shielding portion 5 (maximum width of the light shielding portion in a plan view from the direction of the optical axis OX) is set as t1, t1/Pis preferably set as 9% or less (t1/P≤9%). At this time, P is preferably set within a range of 500 μm to 2000 μm, and t1 is preferably set within a range of 0.1 μm to 45 μm. In a case where the length of the light shielding portion 5 in the optical axis direction is set as L1, L1 is desirably set within a range of 1 mm to 3 mm.

Therefore, in order to ensure sufficient light shielding property against external light, t1 is desirably 0.1 μm or more, P is preferably 2000 μm or less, and L1 is desirably 1 mm or more. However, in a case where t1 exceeds 45 μm, P is less than 500 μm, or L1 exceeds 3 mm, the rate at which the light shielding portion 5 shields the display light IMG increases, and the display image becomes dark. Therefore, it is desirable to set t1, P, and L1 within the above-described ranges, and particularly, by setting t1/P≤9%, prevention of a ghost due to external light and securing of brightness and uniformity of the display image can be realized in a high balance.

Since it is sufficient that the light shielding portion 5 can shield the visible light component of the external light 25 from directing to the optical element 22, the light shielding portion 5 can be formed by using a light absorbing material that absorbs visible light or a light reflecting material that reflects visible light, and thus in some cases, a multilayered structure in which these materials are stacked may be adopted. In a case where a material that reflects visible light is used, the position and shape of the light shielding portion 5 are set so that the reflected external light does not become stray light.

As the material that absorbs visible light, for example, a coating material containing a pigment or a dye can be appropriately selected and used, but particularly, in a case where it is desired to enhance the light absorbing property, a black coating material is preferably selected, and a pigment-containing material is preferably used from the viewpoint of durability. Examples of the pigment include ivory black, peach black, lamp black, bitume, carbon black, and black aniline. Among the pigments, carbon black and black aniline are particularly preferably used. Note that a color material can be appropriately used for various purposes such as obtaining different effects in response to the wavelength of incident external light.

In a case where a reflection layer is formed in the light shielding portion, a specular reflection type and a diffusion reflection type may be used. In the case of using the specular type, an external light ghost can be suppressed by reflecting external light in a direction in which the observation of the display light IMG is not affected. For the specular reflection type light reflecting layer, for example, a metallic pigment-containing material such as aluminum, silver, nickel, stainless steel, copper, zinc, or iron is preferably used. In a case where fine powder of aluminum, silver, nickel, stainless steel, or the like is used alone or in combination, a specular reflection type light reflecting layer in a silver color is obtained. In a case where fine powders of copper, zinc, iron, or the like are used alone or in combination, a specular reflection type light reflecting layer in a gold or red copper color is obtained. In the case of using the diffusion reflection type, it is easy to average the light quantity distribution, suppress the external light ghost, and suppress the brightness unevenness. As the diffusion reflection type light reflecting layer, for example, a pigment-containing material such as silver white, titanium white, zinc white, or aluminum powder is preferably used. The difference between the refractive index of the light shielding portion and the refractive index of the light transmitting base portion is preferably 0.01 to 0.2.

In addition, the method for forming the light shielding portion is not particularly limited, and an appropriate manufacturing method can be adopted. For example, a coating method of applying a coating material containing a coloring material to a predetermined surface of the concavo-convex shape of the first base portion 2 and/or the second base portion 3, or a method of performing vacuum vapor deposition of a metal material such as aluminum can be used. In a case where the light shielding portion 5 is formed by a coating method, a contact type and a non-contact type may be used. Examples of the contact type include an application method by using a brush, a sponge, or the like also used for lens ink coating or the like. Examples of the non-contact type include an application method by using a spray or a dispenser. As described below, in the case of application with a dispenser, an annular light shielding portion can be formed by applying the coating material from a diagonal direction toward a predetermined surface of the concave and convex portion of the first base portion 2 and/or the second base portion 3.

Shape of Light Shielding Portion

The shape of the light shielding portion 5, which is one of the features of the present embodiment, is described with reference to FIG. 5. In addition, the function of the light shielding portion 5 is described with reference to FIG. 6A and the like. In this case, among the two main surfaces of each light shielding portion 5, a surface in contact with the 2*b* surface of the first base portion 2 is referred to as the main surface 5B of the light shielding portion, and a surface in contact with the 3*b* surface of the second base portion 3 is referred to as a main surface 5A of the light shielding portion. That is, the main surface 5A is a main surface closer to the center line C (or the optical axis OX of the optical element 22) among the two main surfaces of each light shielding portion 5, and the main surface 5B is a main surface farther from the center line C among the two main surfaces of each light shielding portion 5. In other words, among the surfaces of the light shielding portion 5 in contact with the base portion made of the light transmitting material, the surface on the side closer to the outer edge of the plate-shaped base portion can be referred to as the main surface 5B (second surface), and the surface on the opposite side may be referred to as the main surface 5A (first surface).

Figure 7:
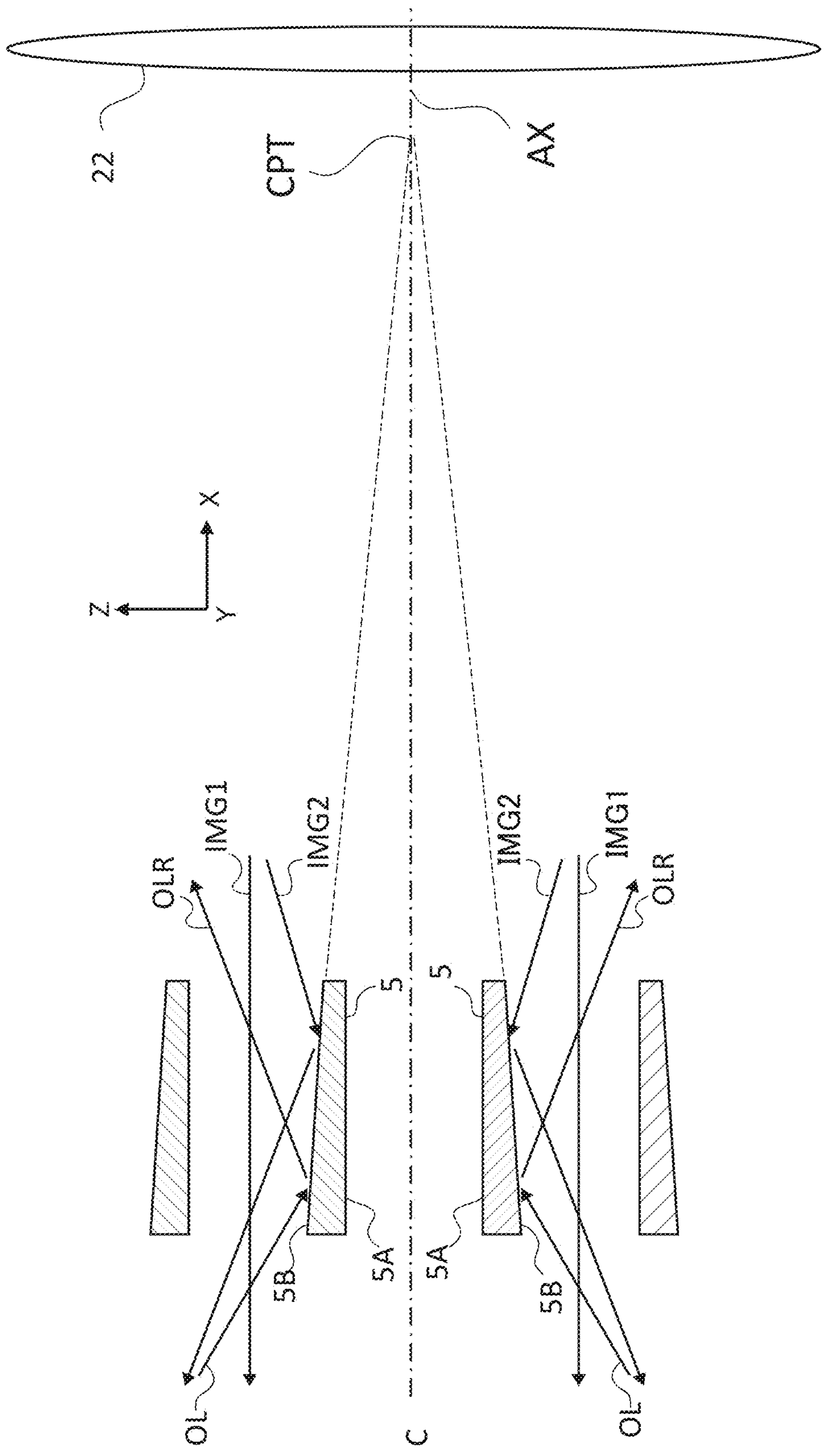
FIG. 7 is a diagram illustrating inclination of a main surface 5B of the light shielding portion in the first embodiment.

As illustrated in FIG. 7, in the louver 23 according to the present embodiment, the main surface 5B is configured to be inclined with respect to the center line C in at least the light shielding portion provided close to the center line C (that is, the optical axis OX of the optical element 22) among the plurality of light shielding portions. That is, the main surface 5B is inclined with respect to the center line C such that in a case where a virtual extension line of the main surface 5B indicated by a broken line in the drawing and the center line C are extended as indicated by an alternate long and short dash line in the drawing, the lines intersect at an intersection CPT further on the optical element 22 side than the louver. In other words, in the head-mounted display 100 illustrated in FIG. 1, the virtual extension line of the main surface 5B of the light shielding portion 5 intersects the optical axis OX between the louver 23 and the optical element 22. In FIG. 7, the extension line of the main surface 5B is illustrated only for the light shielding portion arranged closest to the center line C. However, the main surface 5B can be similarly inclined in other light shielding portions.

The main surface 5A of the light shielding portion is configured to be substantially parallel to the center line C of the louver (in other words, the optical axis AX of the optical element 22). Therefore, the light shielding portion 5 of the present embodiment of which the main surface 5B is inclined has a shape in which the thickness increases toward the side closer to the eye of the user. In other words, in the light shielding portion 5 of the present embodiment of which the main surface 5B is inclined, the thickness on the emission surface side is larger than the thickness on the incident surface side.

In FIG. 5, the light shielding portion is considered to be divided into a portion which has the main surface 5A, a constant thickness, and a rectangular cross section and a portion which has the main surface 5B, the thickness changing from 0 to t2, and a triangular cross section, and t2 can also be referred to as the thickness of the inclined portion for convenience. The angle at which the main surface 5B is inclined with respect to the center line C (or the optical axis OX of the optical element) can also be referred to as an inclination angle θ of the main surface 5B for convenience. Alternatively, the angle at which the main surface 5B is inclined with respect to the main surface 5A can also be referred to as an inclination angle θ of the main surface 5B for convenience.

Figure 6A:
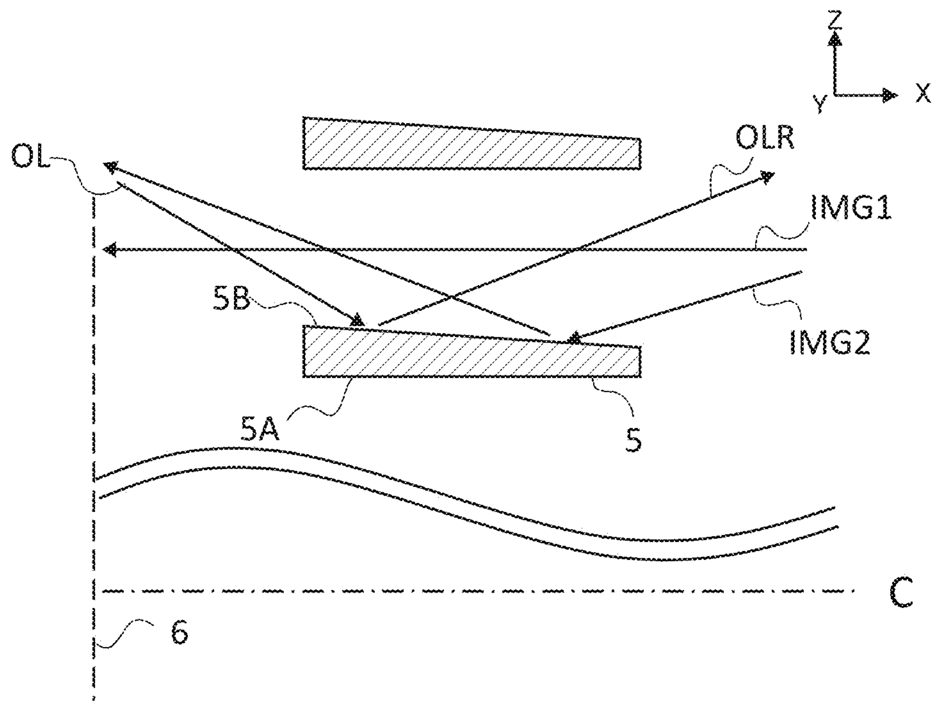
FIG. 6A is a schematic cross-sectional view illustrating an optical action of a light shielding portion in the first embodiment.
Figure 6B:
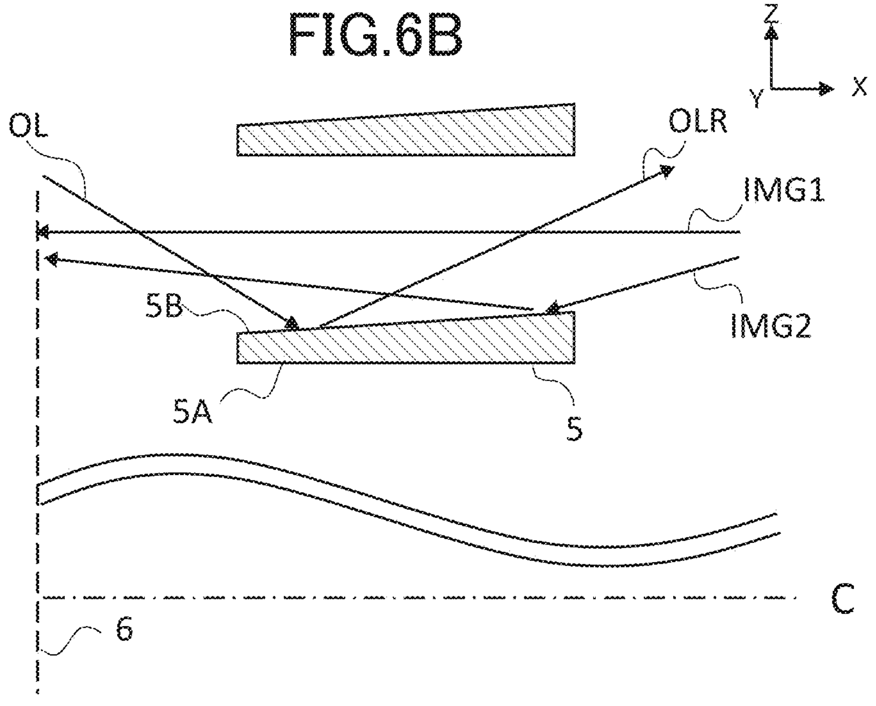
FIG. 6B is a schematic cross-sectional view illustrating an optical action of a light shielding portion in a first reference embodiment.

In order to describe the action and effect of inclining the main surface 5B of the light shielding portion as described above, the first embodiment is illustrated in FIG. 6A, and the first reference embodiment is illustrated in FIG. 6B. For convenience of description and illustration, FIGS. 6A and 6B schematically illustrate only a part of the louver body installed in the head-mounted display in an enlarged manner.

Each of the light shielding portions of the present embodiment illustrated in FIG. 6A is configured such that the virtual extension line of the inclined main surface 5B intersects the optical axis OX between the louver 23 and the optical element 22, that is, on the positive side in the X direction with respect to the louver as described above. On the other hand, unlike the embodiment, the light shielding portion of the first reference embodiment illustrated in FIG. 6B is configured such that the virtual extension line of the main surface 5B intersects with the optical axis OX on the eye side of the user with respect to the louver 23, that is, on the negative side in the X direction with respect to the louver. The light shielding portion of the first reference embodiment has a shape in which the thickness decreases toward the side closer to the eye of the user (the side closer to the emission surface).

In the first embodiment and the first reference embodiment, most of the display light incident through the optical element 22 passes through between the light shielding portions and reaches the broken line 6 indicating the position of the pupil of the user, as in illustrated display light IMG1. A component that is not absorbed in external light OL incident on the light shielding portion is reflected as reflected light OLR in a direction in which the light does not reach the position of the pupil of the user.

As illustrated in FIG. 1 or 5, the light shielding portion 5 has a length of L1 in case of being viewed along the center line C. Therefore, a part of the light beam of the display light collected by the optical element 22 in the head-mounted display and directed to the eye of the user can be applied to the main surface 5B of the light shielding portion as in IMG2 illustrated.

In the first reference embodiment illustrated in FIG. 6B, a component that is not absorbed in the display light IMG2 incident on the main surface 5B of the light shielding portion is reflected toward the position of the pupil of the user in case of being viewed in the Z direction, and thus, a decrease in contrast, a decrease in resolution, and the like occur.

Meanwhile, in the present embodiment illustrated in FIG. 6A, a component that is not absorbed in the display light IMG2 incident on the main surface 5B of the light shielding portion is reflected in a direction deviating from the position of the pupil of the user in case of being viewed in the Z direction, and thus, a decrease in contrast, a decrease in resolution, and the like are not caused. The inclination angle θ of the main surface 5B of the light shielding portion in the present embodiment can be set in the same manner as in the modification of the present embodiment described below with reference to FIGS. 11 and 12.

As compared with the reference embodiment, the embodiment can suppress both a decrease in contrast and resolution due to reflection of the display light by the louver and generation of a ghost due to scattering of external light and stray light by the louver. In order to control the reflection direction of the display light IMG2 and the external light OL by the inclination angle of the main surface 5B, it is desirable that scattering does not occur on the main surface 5B. Therefore, in the present embodiment, the above-described inclined portion is provided on the main surface 5B, and a surface roughness Ra of the main surface 5B is set to 20 nm or less.

Therefore, a method of measuring the surface roughness Ra of the main surface 5B is described. First, a method of measuring the surface roughness Ra of the louver provided with the concentric light shielding portion 5 illustrated in FIG. 3B is described with reference to FIGS. 17A and 17B. Note that the measurement method described below is an example, and the surface roughness Ra may be measured by other methods.

Figure 17A:
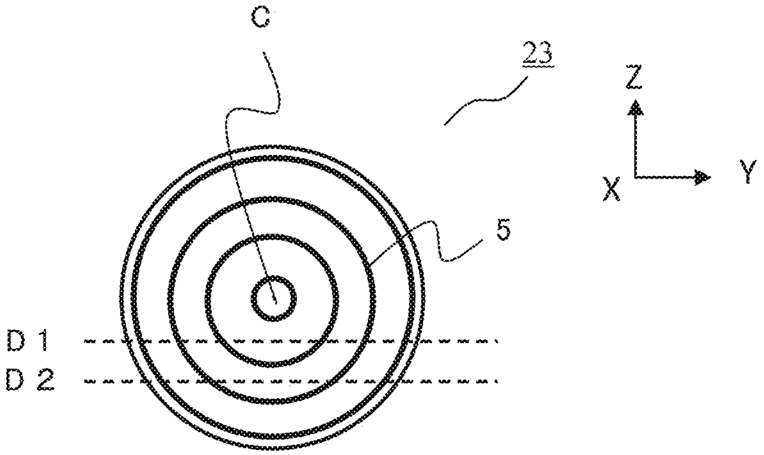
FIG. 17A is a diagram illustrating a method of generating a sample for surface roughness measurement with respect to a concentric light shielding portion.
Figure 17B:
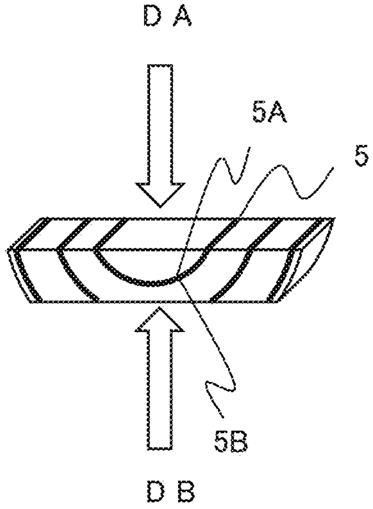
FIG. 17B is a diagram illustrating a method of measuring the surface roughness of the light shielding portion.

First, the louver 23 is cut along lines D1 and D2 illustrated in FIG. 17A to generate an observation sample piece illustrated in FIG. 17B. The observation sample piece is cut so that the surface of 5A, which is the main surface on the side close to the center line C of the light shielding portion 5, can be directly observed through the resin from an observation direction DA, and the surface of 5B, which is the main surface on the side far from the center line C, can be directly observed through the resin from an observation direction DB. Cutting can be performed at a band speed of 60 m/min for example, by using a microcutting machine BS-300CP manufactured by Meiwafosis Co., Ltd. After cutting, the cut surface is polished. Polishing is performed, for example, by using a precision polisher Doctor Wrap ML-180 with a diamond lapping machine (#2000), and then finishing is performed with a polishing cloth.

In a case where the observation sample piece is generated, the surface of 5A is directly observed from the observation direction DA through the resin, and the surface of 5B is directly observed from the observation direction DB through the resin. Specifically, the surface roughness Ra is measured for a region of about 0.2 mm square at an objective lens magnification of 10 times by using a white interferometer Newview 8300 manufactured by ZYGO Corporation. For each of 5A and 5B to be measured, for example, the surface roughness Ra at five points is measured, and the average value thereof is set as the surface roughness Ra of the sample.

Figure 18A:
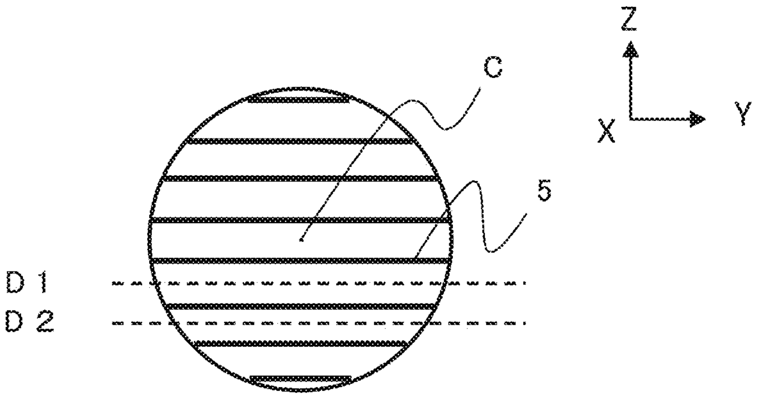
FIG. 18A is a diagram illustrating a method of generating a sample for surface roughness measurement with respect to a stripe shaped light shielding portion.
Figure 18B:
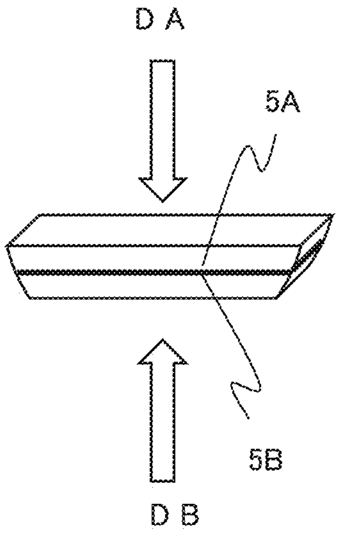
FIG. 18B is a diagram illustrating a method of measuring the surface roughness of the light shielding portion.

Further, in the case of the louver provided with the stripe shaped light shielding portion 5 illustrated in FIG. 3C, the louver 23 is cut along lines D1 and D2 illustrated in FIG. 18A to generate the observation sample piece illustrated in FIG. 18B. The following description of the observation procedure is similar to that of the case of the concentric light shielding portion and thus is omitted.

Manufacturing Method of Louver

Next, a manufacturing method of the louver according to the present embodiment is described. In the manufacturing method according to the present embodiment, as one method of controlling the surface shape of the light shielding portion of the louver, in a case where a base portion serving as an underground of the light shielding portion is formed by using a resin material, the surface shape of the base portion is controlled to have a predetermined surface shape. The surface shape of the base portion can be controlled by molding conditions in a case where the base portion is transferred and molded by using a mold, that is, the type of the resin material, the temperature of the resin material at the time of injection, the pressure holding conditions, and the like. Note that the surface shape of the molding surface of the mold used in a case where the base portion is transferred and molded is particularly useful as a parameter for controlling the shape of the light shielding portion of the louver. In addition, as one method of controlling the surface roughness of the flat portion of the light shielding portion of the louver, in a case where the base portion serving as the underground of the light shielding portion is formed by using a resin material, the surface roughness of the base portion is controlled to be a predetermined surface roughness. The surface roughness of the base portion can be controlled by molding conditions in a case where the base portion is transferred and molded by using a mold, that is, the type of the resin material, the temperature of the resin material at the time of injection, the pressure holding conditions, and the like. Note that the surface roughness of the molding surface of the mold used in a case where the base portion is transferred and molded is particularly useful as a parameter for controlling the surface roughness of the flat portion of the light shielding portion of the louver.

Figure 19A:
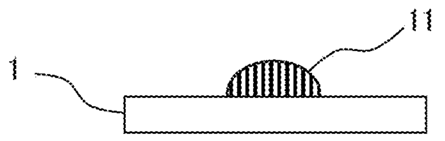
FIG. 19A is a diagram illustrating a stage where a resin material is applied to a substrate in the manufacturing method of a louver according to the first embodiment.

An example of the manufacturing method of the louver according to the present embodiment is described with reference to FIGS. 19A to 19D and FIGS. 20A to 20C. In this example, the substrate 1 is configured to be arranged on the base portion 2 side, and the 2*b* surface of the base portion 2 illustrated in FIG. 5 is first formed on the substrate 1 by using a mold. In the present example, first, as illustrated in FIG. 19A, an appropriate amount of an ultraviolet curable resin material 11 for forming the first base portion 2 is applied onto the substrate 1.

Figure 19B:
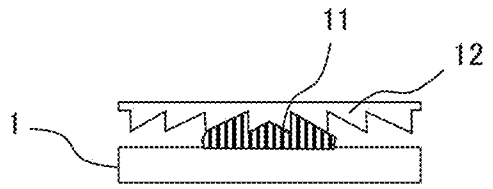
FIG. 19B is a diagram illustrating an intermediate stage of molding the resin material on the substrate by using a mold.

Next, as illustrated in FIG. 19B, the resin material 11 is pressed by a mold 12 for transferring and molding the shape of the first base portion 2, and the resin material 11 is filled between the substrate 1 and the mold 12 so as not to form a gap. In the mold 12, a trace for molding a plurality of concentric concave and convex portions having different diameters on the main surface of the first base portion 2 is formed. More specifically, in the mold 12, the surface for molding the 2*b* surface of the base portion 2 illustrated in FIG. 5 has a transfer surface shape having an inclined portion. Note that the transfer surface shape of the mold can be controlled by adjusting cutting conditions for forming the transfer surface on the mold.

In addition, in the mold 12, in a case where the inclined portion is included in the surface for molding the 2*b* surface of the base portion 2 illustrated in FIG. 5, and a flat portion adjacent to the inclined portion is provided, the transfer surface shape is provided such that the surface roughness Ra is 20 nm or less in the flat portion. Note that the transfer surface shape of the mold can be controlled by adjusting cutting conditions or blasting conditions for forming the transfer surface on the mold.

Figure 19C:
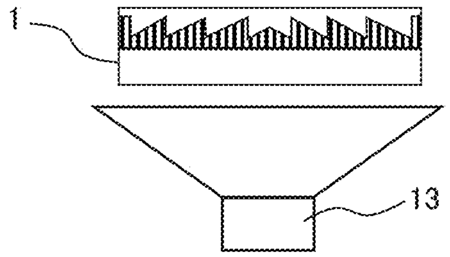
FIG. 19C is a diagram illustrating a stage of irradiating a resin material with ultraviolet radiation to cure the resin material.
Figure 19D:
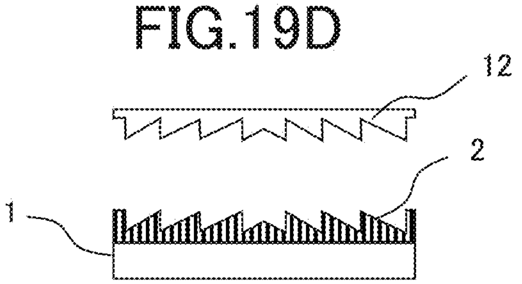
FIG. 19D is a diagram illustrating a stage where a mold is released.

If the filling of the resin material 11 is completed, as illustrated in FIG. 19C, ultraviolet radiation is applied from an ultraviolet light source 13 to cure the ultraviolet curable resin material 11. If the irradiation with the ultraviolet radiation is completed, as illustrated in FIG. 19D, the first base portion 2 formed in close contact with the substrate 1 is released from the mold 12. Furthermore, in order to completely cure the resin material, the resin material may be set in an oven and subjected to heat treatment. In this manner, the inclined portion is formed on the 2*b* surface of the base portion 2 illustrated in FIG. 5.

In addition, in a case where a flat portion adjacent to the inclined portion of the surface forming the 2*b* surface of the base portion 2 illustrated in FIG. 5 is provided, the surface roughness Ra is formed to be 20 nm or less in the flat portion.

Figure 20A:
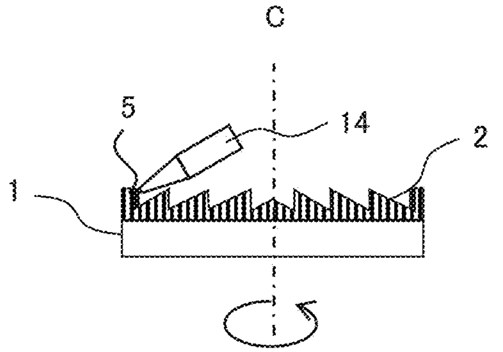
FIG. 20A is a diagram illustrating a stage of applying a material of a light shielding portion using a dispenser in the manufacturing method of the louver according to the first embodiment.

Next, a light shielding portion is formed on the 2*b* surface of the first base portion 2 described with reference to FIG. 5. Specifically, as illustrated in FIG. 20A, the substrate 1 is rotated about the center line C of a plurality of concentric circles having different diameters as a rotation shaft, and the material of the light shielding portion 5 is applied along the 2*b* surface of each concentric circle by using the dispenser 14. By appropriately tilting the dispenser 14 and applying the coating material, the coating material containing the light shielding material can be applied only to the 2*b* surface without contaminating the 2*a* surface. After completion of the application, the light shielding portion 5 is formed on the first base portion 2 by heating and baking in an oven to dry and cure the coating material.

In this example, the 2*b* surface of the first base portion 2 in which the inclined portion is formed on the surface is covered with the light shielding material, so that 5B, which is the main surface on the side far from the center line C of the light shielding portion 5, is formed. Therefore, the surface shape of 5B is an inclined shape reflecting the surface shape of the 2*b* surface of the first base portion 2 as it is.

In addition, in a case where a flat portion adjacent to the inclined portion of the surface forming the 2*b* surface of the base portion 2 is provided, the 2*b* surface of the first base portion 2 in which the surface roughness Ra is formed to be 20 nm or less in the flat portion is covered with the light shielding material, whereby 5B, which is the main surface on the side far from the center line C of the light shielding portion 5, is formed. Therefore, the surface shape of the flat portion adjacent to the inclined portion of 5B is a shape directly reflecting the surface shape of the flat portion adjacent to the inclined portion of the 2*b* surface of the first base portion 2, and the surface roughness of the flat portion adjacent to the inclined portion of 5B is 20 nm or less.

Next, an appropriate amount of an ultraviolet curable resin material 16 for forming the second base portion 3 is applied onto the first base portion 2 on which the light shielding portion 5 is formed. Further, the resin material 16 is pressed by the mold plate 15 for transferring and molding the shape of the flat surface of the second base portion 3, and the resin material 16 is filled between the first base portion 2 on which the light shielding portion 5 is formed and a mold plate 15 so as not to form a gap. Note that the mold plate 15 is made of a transparent material that transmits ultraviolet radiation, and the molding surface in contact with the resin material 16 is a flat surface.

Figure 20B:
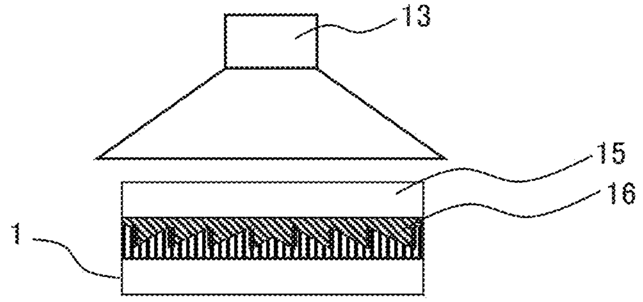
FIG. 20B is a diagram illustrating a stage where a resin material for forming a first base portion is applied, and then ultraviolet radiation are applied through a die plate to cure the resin material.
Figure 20C:
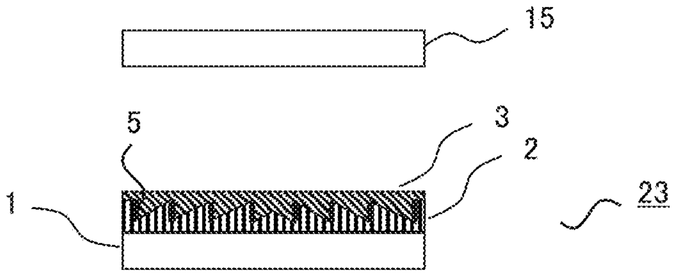
FIG. 20C is a diagram illustrating a stage where the mold is released.

If the filling of the resin material 16 is completed, as illustrated in FIG. 20B, ultraviolet radiation is applied from the ultraviolet light source 13 to cure the ultraviolet curable resin material 16. If the irradiation with ultraviolet radiation is completed, the mold plate 15 is released as illustrated in FIG. 20C. Furthermore, in order to completely cure the resin material, the resin material may be set in an oven and subjected to heat treatment.

According to the example of the manufacturing method described above, the close contact two-layer louver 23 according to the embodiment can be manufactured. In this example, the light shielding portion to which the surface shape having the inclined portion is transferred is formed on the 2*b* surface of the first base portion 2 serving as the underground of 5B which is the main surface on the side far from the center line C by using the mold. In addition, in a case where a flat portion adjacent to the inclined portion is provided on the 2*b* surface of the first base portion 2 serving as the underground of 5B which is the main surface on the side far from the center line C, a light shielding portion having a surface roughness Ra of 20 nm or less is formed in the flat portion by using a mold.

As described above, the louver 23 mounted on the head-mounted display of the present embodiment is configured such that the virtual extension line of the main surface 5B positioned on the opposite side of the center line C intersects the optical axis OX between the louver 23 and the optical element 22. Therefore, the display light IMG2 applied to the main surface 5B is reflected to the outside of the pupil of the user, and unnecessary display light reaching the pupil of the user is suppressed. Therefore, image quality decrease factors such as a decrease in contrast and a decrease in resolution can be suppressed.

Second Embodiment

The second embodiment as a modification of the first embodiment is described. Description of matters similar to those in the first embodiment is simplified or omitted. In the first embodiment, the main surface 5B of the light shielding portion forms one inclined surface as a whole, but the present embodiment is different in that the main surface 5B of the light shielding portion includes a plurality of inclined surfaces. That is, it can also be said that the light shielding portion of the present embodiment includes a portion that has the main surface 5A, a constant thickness, and a rectangular cross section, and a plurality of inclined portions that have a triangular cross section on the portion. Note that the number of inclined surfaces (or inclined portions) included in one light shielding portion is not limited to the example of the drawings referred to below and may be any number as long as the inclined surfaces are formed with predetermined shape accuracy.

Figure 8A:
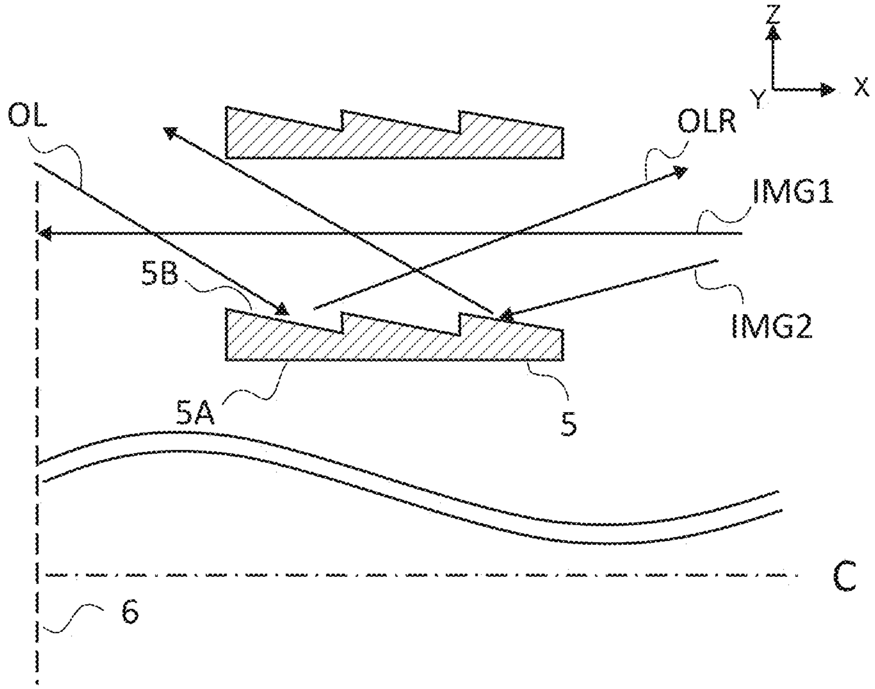
FIG. 8A is a schematic cross-sectional view illustrating an optical action of a light shielding portion in a second embodiment.
Figure 8B:
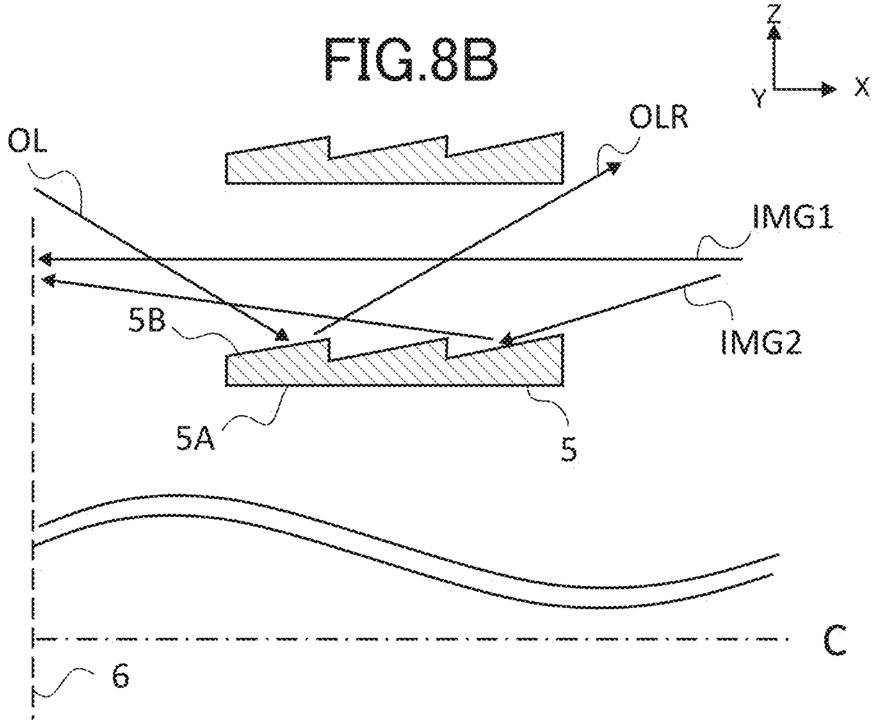
FIG. 8B is a schematic cross-sectional view illustrating an optical action of a light shielding portion in a second reference embodiment.

FIG. 8A illustrates the second embodiment, and FIG. 8B illustrates the second reference embodiment. For convenience of description and illustration, FIGS. 8A and 8B schematically illustrate only a part of the louver body installed in the head-mounted display in an enlarged manner.

In the present embodiment illustrated in FIG. 8A, each light shielding portion is configured to include three inclined portions in which the virtual extension line of the main surface 5B is inclined so as to intersect the optical axis OX between the louver 23 and the optical element 22, that is, on the positive side in the X direction with respect to the louver. Meanwhile, in the second reference embodiment illustrated in FIG. 8B, each light shielding portion includes three inclined portions configured such that the virtual extension line of the main surface 5B intersects with the optical axis OX on the eye side of the user with respect to the louver 23, that is, on the negative side in the X direction with respect to the louver. In other words, the light shielding portion of the second reference embodiment includes three inclined portions having a shape in which the thickness decreases toward the side closer to the eye of the user.

In the second embodiment and the second reference embodiment, most of the display light incident through the optical element 22 passes through between the light shielding portions and reaches the broken line 6 indicating the position of the pupil of the user, as in the illustrated display light IMG1. A component that is not absorbed in the external light OL incident on the light shielding portion is reflected as the reflected light OLR in a direction in which the light does not reach the position of the pupil of the user.

A part of the light beam of the display light directed to the eye of the user via the optical element 22 in the head-mounted display can be applied to the main surface 5B of the light shielding portion as in IMG2 illustrated.

In the second reference embodiment illustrated in FIG. 8B, a component that is not absorbed in the display light IMG2 incident on the main surface 5B of the light shielding portion is reflected toward the position of the pupil of the user in case of being viewed in the Z direction, and thus, a decrease in contrast, a decrease in resolution, and the like occur.

Meanwhile, in the present embodiment illustrated in FIG. 8A, a component that is not absorbed in the display light IMG2 incident on the main surface 5B of the light shielding portion is reflected in a direction deviating from the position of the pupil of the user in case of being viewed in the Z direction, and thus, a decrease in contrast, a decrease in resolution, and the like are not caused.

Figure 11:
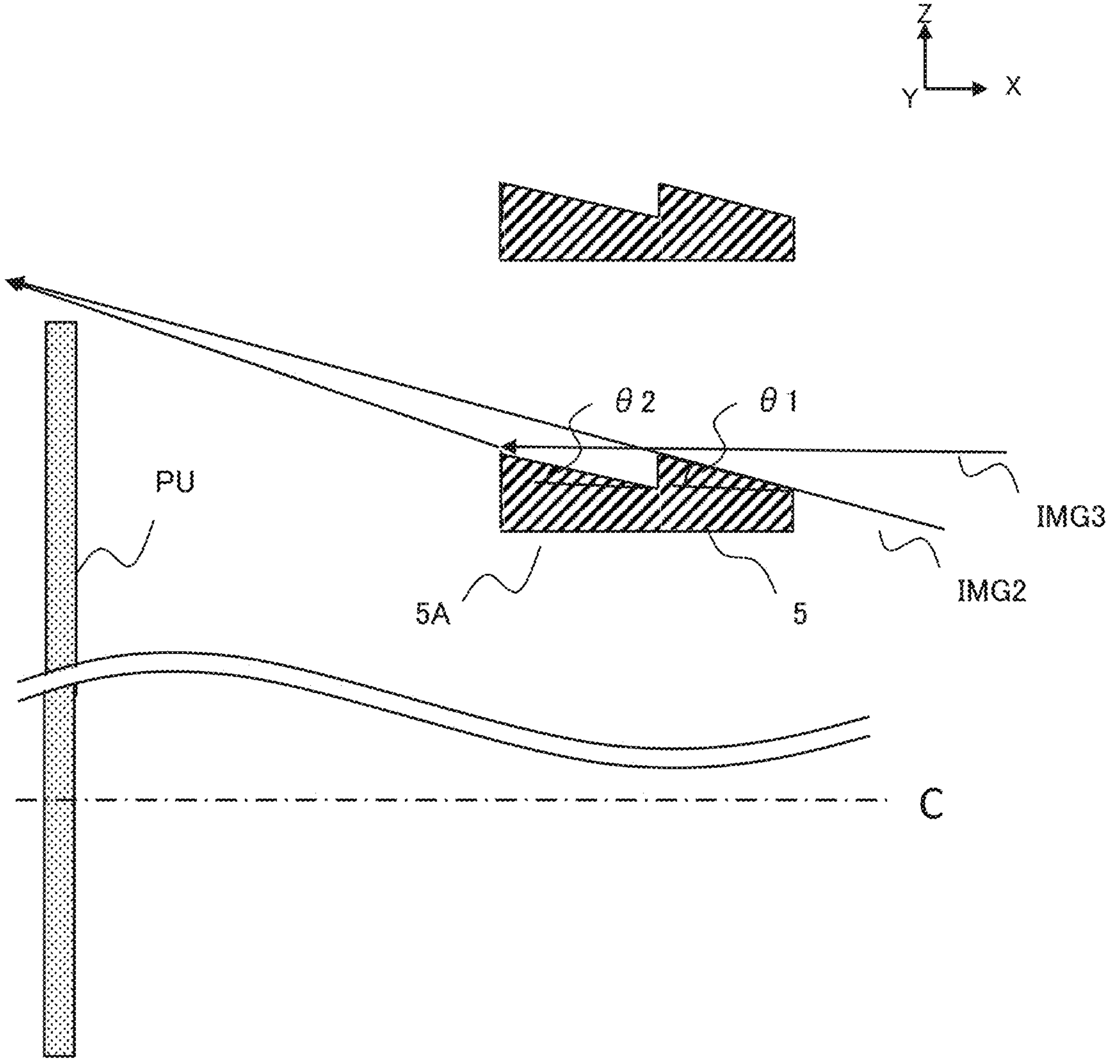
FIG. 11 is a diagram illustrating an inclination angle of the main surface 5B in the inclined portion of the embodiment and an action thereof.
Figure 12:
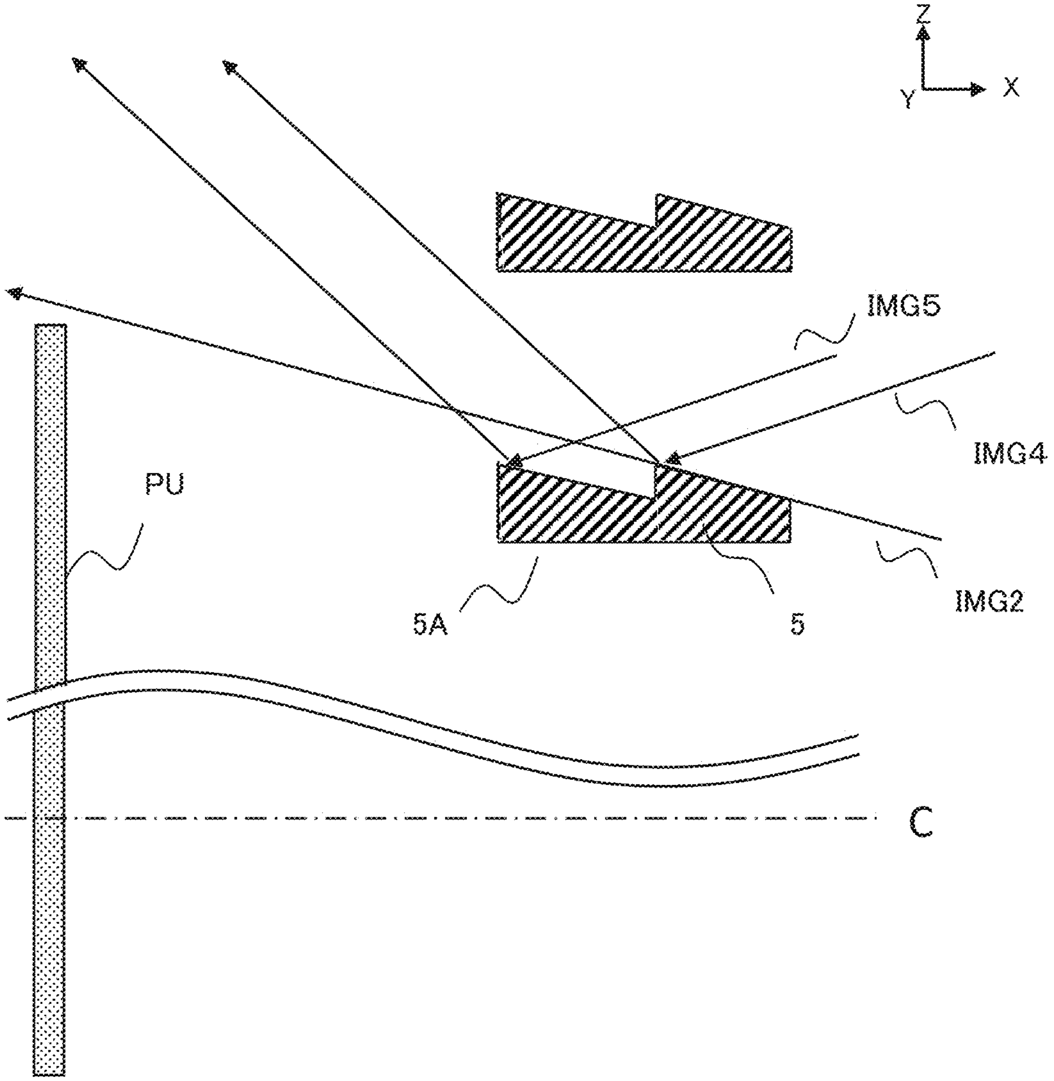
FIG. 12 is a diagram illustrating an inclination angle of the main surface 5B in the inclined portion of the embodiment and an action thereof.

The inclination angle of the main surface 5B in the inclined portion is described with reference to FIGS. 11 and 12. FIGS. 11 and 12 schematically illustrate the pupil of the user as a PU. Here, an example in which each light shielding portion includes two inclined surfaces (inclined portions) is described, but the number of inclined surfaces (inclined portions) may be any number. The concept of the inclination angle described here can be similarly applied to the inclination angle in other embodiments.

In FIG. 11, the inclination angle of the inclined portion closest to the optical element (close to the incident surface of the louver) is set as θ1, and the inclination angle of the inclined portion closer to the pupil PU of the user (close to the emission surface of the louver) is set as θ2. An inclination angle of an n-th inclined surface counted from the optical element side is set as On. Note that, in a case where there is a single inclined surface as in the first embodiment, only θ1 may be considered.

As illustrated in FIG. 11, the inclination angle θ1 is set so as to transmit light directed toward the outside (Z direction) of the pupil PU but shield the unnecessary display light IMG2 directed toward the pupil PU in the unnecessary display light IMG2 that causes a decrease in contrast and a decrease in resolution. Further, as illustrated in FIG. 12, unnecessary display light IMG4 with which the inclined portion is irradiated is reflected toward the outside (Z direction) of the pupil PU, and a decrease in contrast and a decrease in resolution are suppressed.

In addition, as illustrated in FIG. 11 or 12, the inclination angle θ2 reflects both display light IMG3 for irradiating a position of the inclined portion close to the pupil PU at a shallow angle and display light IMG5 for irradiating the position at a deep angle toward the outside (Z direction) of the pupil PU. This suppresses a decrease in contrast and a decrease in resolution.

In addition, in a case where the end portion on the maximum thickness side of the n-th inclined portion is irradiated with the display light incident along the line connecting the maximum thickness positions of the n−1-th inclined portion and the n-th inclined portion, the inclination angle θn is set to an angle at which the display light is reflected to the outside of the pupil PU, so that it is possible to prevent unnecessary display light from entering the pupil PU.

As described above, the louver 23 mounted on the head-mounted display of the present embodiment includes a plurality of inclined surfaces configured such that the extension line of the main surface 5B positioned on the opposite side of the center line C intersects the optical axis OX between the louver 23 and the optical element 22. Therefore, the display light IMG2 applied to the main surface 5B is reflected to the outside of the pupil of the user, and unnecessary display light reaching the pupil of the user is suppressed. Therefore, image quality decrease factors such as a decrease in contrast and a decrease in resolution can be suppressed. Furthermore, in the present embodiment, even in a case where a light shielding portion having a large length is provided along the optical axis OX, since the inclined surface is divided into a plurality of portions, the maximum thickness t1 of the light shielding portion can be suppressed, and a decrease in the utilization rate of the display light can be prevented.

Third Embodiment

The third embodiment as a modification of the first embodiment is described. Description of matters similar to those in the first embodiment is simplified or omitted. In the first embodiment, the main surface 5B of the light shielding portion forms one inclined surface as a whole, but in the present embodiment, one or a plurality of inclined surfaces are provided on the side of the optical element 22 in the main surface 5B, and a non-inclined surface substantially parallel to the center line C is provided on the pupil side of the user. Note that the portion of the non-inclined surface can also be referred to as a flat portion for convenience.

Figure 9A:
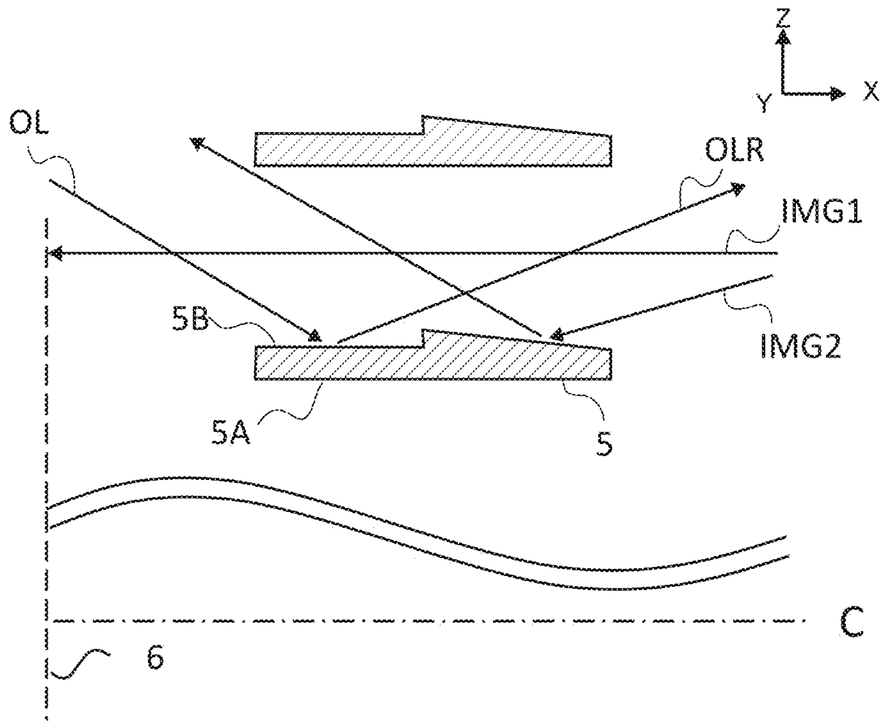
FIG. 9A is a schematic cross-sectional view illustrating an optical action of a light shielding portion in a third embodiment.
Figure 9B:
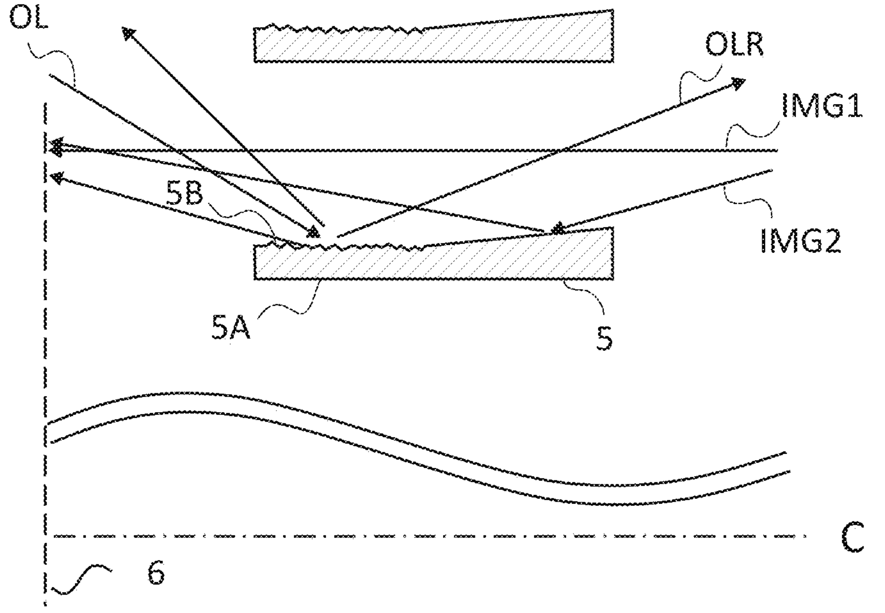
FIG. 9B is a schematic cross-sectional view illustrating an optical action of a light shielding portion in a third reference embodiment.
Figure 10:
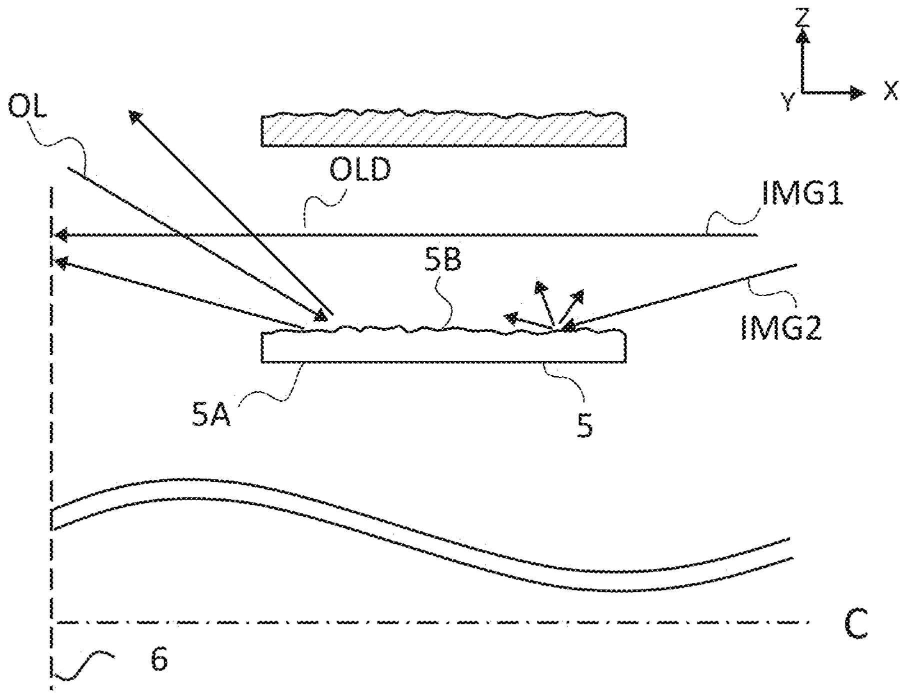
FIG. 10 is a schematic cross-sectional view illustrating an optical action of a light shielding portion in a fourth reference embodiment.

FIG. 9A illustrates the third embodiment, FIG. 9B illustrates the third reference embodiment, and FIG. 10 illustrates the fourth reference embodiment. For convenience of description and illustration, these drawings schematically illustrate only a part of the louver body installed in the head-mounted display in an enlarged manner.

Each of the light shielding portions of the present embodiment illustrated in FIG. 9A includes an inclined surface similar to that of the previously described embodiment on the optical element 22 side (incident surface side) of the main surface 5B and includes a non-inclined surface substantially parallel to the center line C on the pupil side of the user (emission surface side). Note that the non-inclined surface (the surface of the flat portion) is configured as a highly smooth surface having a surface roughness Ra of 20 nm or less.

In general, OL, which is external light or stray light, has brightness higher than that of display light. Therefore, even if OL partially enters the eyes of the user, image quality degradation for the user, such as occurrence of ghost, occurs. As illustrated in FIG. 9A, OL incident on the light shielding portion is mainly applied to a position (flat portion) close to the pupil of the user in the light shielding portion, but a component that is not absorbed is reflected as reflected light OLR in a direction not reaching the position of the pupil of the user. Since the surface of the flat portion is configured as a surface having small surface roughness Ra and high smoothness, the reflected light OLR is prevented from reaching the pupil of the user as scattered light. Meanwhile, since the unnecessary display light IMG2 is reflected to the outside of the pupil by the inclined surface as described above, a decrease in contrast, a decrease in resolution, and the like are suppressed.

In the present embodiment, even in a case where a light shielding portion having a large length is provided along the optical axis OX, since the non-inclined surface is provided on a side close to the pupil of the user, the maximum thickness t1 of the light shielding portion can be suppressed, and a decrease in the utilization rate of the display light can be prevented.

In the third reference embodiment illustrated in FIG. 9B, an inclined surface similar to that of the first reference embodiment in FIG. 6B is provided on the optical element 22 side of the main surface 5B. That is, an inclined surface in which the virtual extension line is inclined in a direction intersecting the optical axis OX on the negative side in the X direction with respect to the louver is provided. Further, a non-inclined surface that is a rough surface that is substantially parallel to the center line C and has a large surface roughness Ra is provided on the pupil side of the user in the main surface 5B.

As illustrated, in the third reference embodiment, the unnecessary display light IMG2 reflected by the inclined surface is reflected toward the pupil of the user. In addition, since the surface of the flat portion is a rough surface having a large surface roughness Ra, OL having high brightness is scattered, and a part of the OL reaches the pupil of the user. Therefore, the light shielding portion of the third reference embodiment has the same maximum thickness as the light shielding portion of the third embodiment but is likely to cause a decrease in contrast, a decrease in resolution, a ghost due to external light or stray light, and the like.

In the fourth reference embodiment illustrated in FIG. 10, the main surface 5B of the light shielding portion is not inclined with respect to the center line C and is configured as a rough surface having a large surface roughness Ra. Since the inclined portion is not provided, the maximum film thickness of the light shielding portion is small, and an opening through which the effective display light IMG1 is transmitted can be enlarged. However, since the unnecessary display light IMG2 and the external light OL having high brightness are scattered and reach the eye of the user, a decrease in contrast, a decrease in resolution, a ghost due to external light, and the like easily occur as compared with the embodiment.

EXAMPLES

Figure 13:
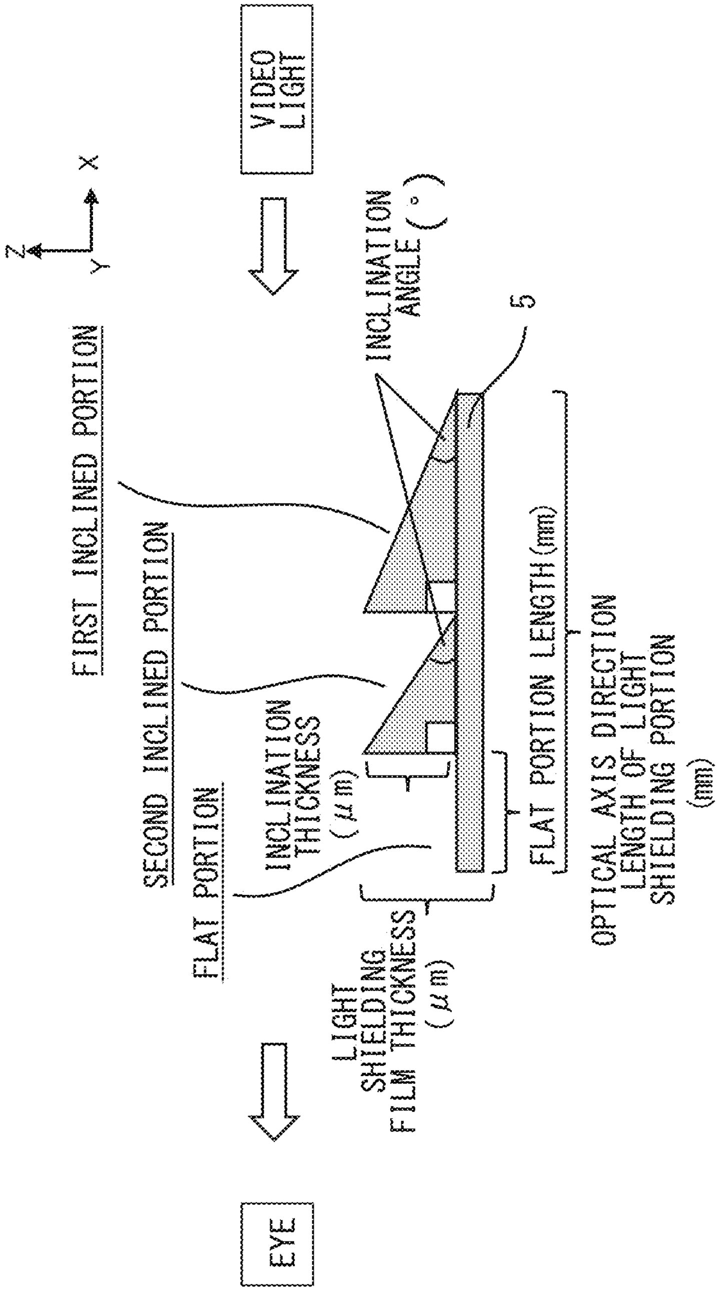
FIG. 13 is a diagram illustrating a configuration of examples.

Specific examples and comparative examples are described below. FIG. 14 is a table summarizing specifications of Examples 1 to 6 and Comparative Examples 1 and 2. Also, FIG. 13 is a reference diagram for understanding terms described in the table of FIG. 14.

In the table illustrated in FIG. 14, "Ra Outside Optical Axis" indicates surface roughness of the main surface 5B (main surface on a side far from the center line C) of the light shielding portion, and the unit is nm.

"Louver Shape" indicates a shape of the light shielding portion in a case where the louver is viewed in a plan view along the optical axis OX of the optical element 22. "Annular Shape" indicates the shape illustrated in FIG. 3B, and the "Straight Line" indicates the shape illustrated in FIG. 3C.

"Inclination Thickness Increasing Direction" indicates a direction in which the thickness of the inclined portion increases, and "+" indicates a case where the thickness of the inclined portion increases along the traveling direction of the display light on the optical axis OX (or the center line C) as illustrated in FIG. 6A. In addition, "−" refers to a case where the thickness of the inclined portion decreases along the traveling direction of the display light in the optical axis OX (or the center line C) as illustrated in FIG. 6B, and Comparative Example 1 and Comparative Example 2 correspond thereto.

"Number of Inclinations" indicates the number of inclined portions formed in one light shielding portion. "Inclination Angle" corresponds to θ illustrated in FIG. 5 and indicates an angle formed by the inclined surface with respect to the center line C (or the main surface 5A). Note that, as illustrated in FIG. 13, the first inclination refers to the inclined portion (inclined surface) on the side closest to the optical element 22 (the side on which the video light is incident) among the inclined portions, and the second inclination refers to the second inclined portion (inclined surface) from the side close to the optical element 22. "Inclination Thickness" corresponds to the inclination thickness illustrated in FIG. 13 (or t2 illustrated in FIG. 5), and the unit is μm. "Light Shielding Portion Thickness" corresponds to the inclination film thickness illustrated in FIG. 13 (or t1 illustrated in FIG. 5), and the unit is μm. "Inclination Width" is a length of the inclined portion in case of being viewed along the center line C (or the optical axis OX), and the unit is μm.

"Flat Portion Length" is a length of the flat portion in case of being viewed along the center line C (or the optical axis OX) in a case where the flat portion is formed on the side close to the eye of the user (the side where the video light is emitted from the louver) as illustrated in FIG. 13, and the unit is mm. "Optical Axis Direction Length of Light Shielding Portion" corresponds to the length in the optical axis direction of the light shielding portion illustrated in FIG. 13 or L1 illustrated in FIG. 5, and the unit is mm. "Louver Center/Eye Length" corresponds to L2 illustrated in FIG. 1 or 5, and the unit is mm. "Light Shielding Portion Interval" corresponds to P illustrated in FIG. 5, and the unit is mm.

"Reflection of Display Light on Outer Side of Optical Axis" refers to a decision result as to whether the unnecessary display light (for example, IMG2 to IMG5) applied to the light shielding portion reaches the pupil PU of the user, and a decrease in contrast or a decrease in resolution may occur. Specific determination criteria for "A" and "B" are described below.

"Reflection/Scattering of External Light/Stray Light" refers to a decision result as to whether external light/stray light (for example, OL) with which the light shielding portion is irradiated is reflected or scattered and reaches the pupil PU of the user to cause image quality degradation such as a ghost. Specific determination criteria for "A" and "B" are described below.

First, matters common to examples and comparative examples are described.

For the substrate 1, optical glass containing boron and silicon was used. Specifically, a circular plate material having a diameter of $45 mm was prepared by using S-BSL7 manufactured by Ohara Inc. As the mold 12 for forming the concave and convex portion on the base portion, one obtained by cutting the NiP layer plated on the metal parent material with a precision processing machine to form a desired inverted shape of the concave and convex portion was used. At this time, high-precision cutting was performed to adjust the surface shape and roughness of the surface of the mold 12.

The first base portion 2 was formed by using an ultraviolet curable acrylic resin composition having a refractive index of 1.58 after curing. The light shielding portion 5 was formed by applying a coating material as a raw material of the light shielding portion from a diagonal direction by using a dispenser while rotating the substrate 1 about the center of the concentric circle of the first base portion 2 as a rotation center. The dispenser is used because the dispenser can supply a discharge amount appropriate for forming a film thickness of about 10 μm, the number of concentric circles to be coated per substrate is as small as about 20, and the dispenser is compatible with previous and subsequent processes. The coating material was applied by diluting the stock solution by using an organic solvent. Thereafter, the resulting product was heated and dried in an oven at 80° C. for 4 hours. The refractive index of the light shielding portion 5 after the coating material was dried was 1.68. The second base portion 3 was formed of the same ultraviolet curable acrylic resin composition as that of the first base portion 2 to produce a close contact two-layer louver element.

Evaluation of each sample was performed as follows. A head-mounted display on which a louver element to be evaluated was installed in a dark room not affected by external light, and a digital camera was installed at a position corresponding to the eye of the user in a case where the head-mounted display was mounted.

First, in order to evaluate image quality degradation caused by the display light being reflected by the main surface of the light shielding portion, a chart in which white and black squares of 1 mm square are arranged in a lattice shape was displayed on a head-mounted display and photographed by a digital camera. The rate between the white display unit and the black display unit on the data is 1:1. The light intensity average value of the five white display units photographed by the digital camera was taken as the white display unit intensity, and the light intensity average value of the five black display units was taken as the black display unit intensity.

In a case where the rate of the black display unit intensity to the white display unit intensity of the display light was 0.01 or less, "Reflection of Display Light on Outer Side of Optical Axis" was evaluated as A, that is, excellent. In a case where the rate of the intensity of the black display unit to the white display unit of the display light was more than 0.01, "Reflection of Display Light on Outer Side of Optical Axis" was evaluated as B, that is, poor.

Next, in order to evaluate image quality degradation caused by reflection of external light or stray light reflected from the external light on the main surface of the light shielding portion, white parallel light having a diameter of 5 mm simulating the external light or stray light reflected from the external light was applied by using LED illumination. As the irradiation direction of the white parallel light, irradiation in six levels in total including three levels inclined by 45°, 60°, and 75° with respect to the YZ plane of the louver element in two levels corresponding to the upper backward side and the lateral backward side as viewed from the user were performed. In addition, with respect to the irradiation position of the white parallel light, the white parallel light was applied to three positions of the center of the louver, an intermediate position between the center and the outer periphery toward the upward direction Z from the center, and an intermediate position between the center and the outer periphery toward the lateral direction Y outside from the center. The levels of the irradiation direction and the irradiation position are 18 levels in total. Also, the light intensity per unit area of the white parallel light was 100 times the light intensity at the time of white display on the display panel 21. Photographing was performed with the digital camera in a state where the LED illumination was turned on while white display was performed on the display panel 21. The light intensity average value of the five white display units photographed by the digital camera was taken as the white display unit intensity. Thereafter, while the display panel 21 was displayed in black, the LED illumination was turned on, irradiation was performed in the above-described 18 levels, and the light intensity average value of the entire surface photographed by the digital camera was taken as the unnecessary light intensity.

In a case where the rate of the unnecessary light intensity to the white display unit intensity of the display light was 0.01 or less, "Reflection/Scattering of External Light/Stray Light" was evaluated as A, that is, excellent, and in a case where the rate was more than 0.01, "Reflection/Scattering of External Light/Stray Light" was evaluated as B, that is, poor.

Example 1

One inclined portion in which the inclined width of the mold decreases in the mold removal direction at the time of transfer molding was provided over the entire width on one surface (surface for molding the 2*b* surface of the first base portion 2) used in the transfer molding of the mold 12 used at the time of forming the base portion. The inclination angle was set to 3.8°. Also, the surface roughness Ra of the transfer molding surface of the mold 12 was 8 nm. The coating material as the raw material of the light shielding portion 5 was applied to the 2*b* surface by using the dispenser 14. A stock solution of the coating material was diluted 4 times with an organic solvent and was applied. The coating thickness was set to a minimum thickness of 0.1 μm at the end portion of the 2*b* surface on the base portion 3 side, and a maximum thickness of 45 μm at the end portion on the base portion 1 side along the inclined portion, and a surface in which the coating thickness of the inclined portion was linearly changed from 0 μm to 44.9 μm was formed. With respect to the 2*b* of the main surface of the light shielding portion, in a case where the louver 23 was mounted as the head-mounted display with the shape of the 2*b* surface of the first base portion 2 reflected, 2*b* of the main surface of the light shielding portion has one inclined surface which is inclined in the direction intersecting the optical axis of the condensing optical unit and of which thickness increases in the direction from the condensing optical unit toward the eye of the user, the surface roughness Ra of the inclined portion is 8 nm, and an annular light shielding portion is formed. The length of the light shielding portion 5 in the optical axis direction was 0.68 mm, the distance between the center of the louver and the eye of the user was 30 mm, and the interval of the light shielding portions was 1 mm.

Example 2

One inclined portion was provided on a part of the 2*b* surface with an end portion on the optical unit side as a start point of the inclined portion. Example 2 was the same as Example 1 except that the surface roughness Ra of the flat portion adjacent to the inclined portion was 18 nm, and the length of the light shielding portion 5 in the optical axis direction was 1 mm.

Example 3

Over the entire width of the 2*b* surface, 15 inclined portions were provided. A surface in which the inclination angle of the first inclined portion from the optical unit side was 18.5°, the inclination angle of the second and subsequent inclined portions was 12.8°, a minimum thickness of the coating thickness was 0.1 μm at the end portion of the 2*b* surface on the base portion 3 side along the inclined portion, a maximum thickness thereof was 44 μm at the end portion on the base portion 1 side, and the coating thickness of each inclined portion was linearly changed from 0 μm to 43.9 μm was formed. Also, Example 3 was the same as Example 1 except that the length of the light shielding portion 5 in the optical axis direction was 2.027 mm, the distance between the center of the louver and the eye of the user was 5 mm.

Example 4

Over the entire width of the 2*b* surface, 340 inclined portions were provided. A surface in which the inclination angle of the first inclined portion from the optical unit side was 23.3°, the inclination angle of the second and subsequent inclined portions was 15.4°, a minimum thickness of the coating thickness was 0.1 μm at the end portion of the 2*b* surface on the base portion 3 side along the inclined portion, a maximum thickness thereof was 2.1 μm at the end portion on the base portion 1 side, and the coating thickness of each inclined portion was linearly changed from 0 μm to 2.0 μm was formed. Also, Example 4 was the same as Example 1 except that the length of the light shielding portion 5 in the optical axis direction was 1.702 mm, the distance between the center of the louver and the eye of the user was 5 mm, the surface roughness Ra of the inclined portion was 18 nm, and the interval of the light shielding portions was 2 mm.

Example 5

Example 5 was the same as Example 3 except that the shape of the light shielding portion was linear.

Example 6

Example 6 was the same as Example 3 except that the surface roughness Ra of the inclined portion was 100 nm.

Comparative Example 1

The inclined portions were provided in an inclination direction and an arrangement of the inclined portions in opposite directions to those in Example 1. Comparative Example 1 was the same as Example 2 except that the surface roughness Ra of the flat portion adjacent to the inclined portion was 100 nm.

Comparative Example 2

Comparative Example 2 was the same as Example 3 except that inclined portions were provided in an inclination direction opposite to that of Example 3.

As illustrated in the table of FIG. 14, in Comparative Example 1 and Comparative Example 2, all the evaluation indexes were B evaluation, and it can be seen that a decrease in contrast and a decrease in resolution due to unnecessary display light, a ghost due to external light and stray light, and the like occur, and good image quality cannot be provided.

Meanwhile, in Examples 1 to 6, both unnecessary display light applied to the light shielding portion and external light or stray light applied to the light shielding portion are prevented from reaching the pupil of the user. That is, it can be seen that all of a decrease in contrast and a decrease in resolution due to unnecessary display light, and occurrence of ghost and the like due to external light and stray light are suppressed, and good image quality can be provided.

In a case where the louvers of Examples 1 to 6 are mounted on the head-mounted display, it is possible to display an image to the user in a state in which loss and turbulence are suppressed, and it is possible to suppress entrance of external light and stray light to the eyes of the user. Meanwhile, in a case where the louvers of Comparative Examples 1 and 2 were mounted on the head-mounted display, image quality degradation due to reflection of display light and image quality degradation due to scattering or reflection of external light or stray light occurred.

Modifications of Embodiments

Note that the present disclosure is not limited to the embodiments or examples described above, and many modifications can be made within the technical concept of the present disclosure. For example, all or some of the different embodiments and examples described above may be combined and implemented.

Figure 15:
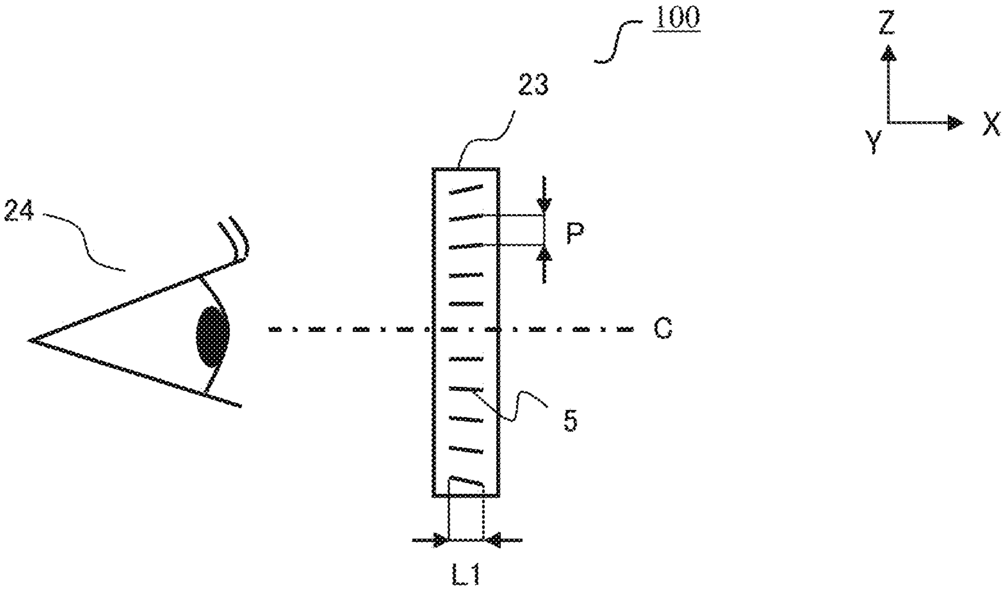
FIG. 15 is a diagram illustrating a modification of the embodiment.
Figure 16:
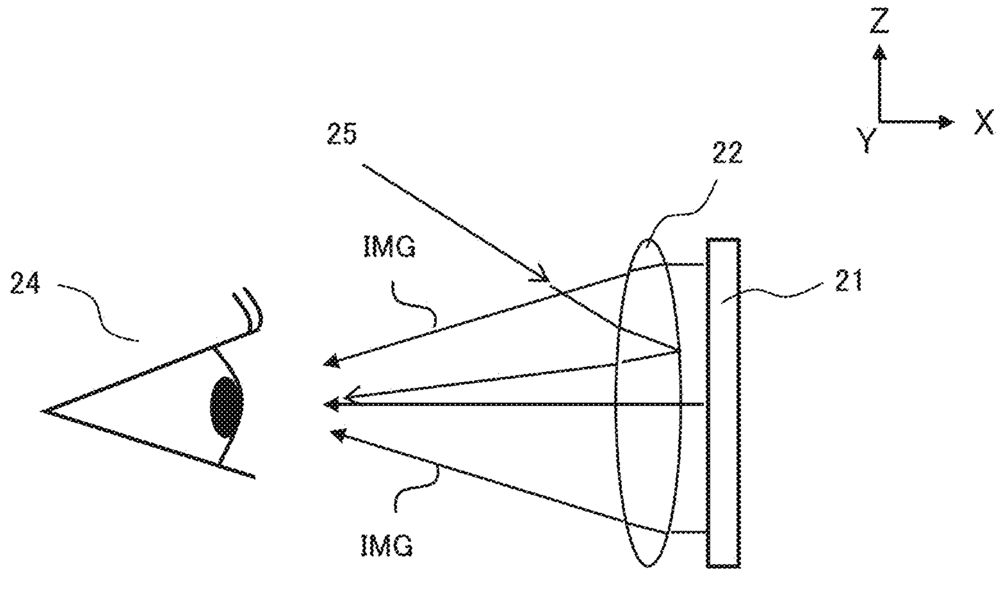
FIG. 16 is a schematic diagram illustrating a configuration of a conventional head-mounted display.

For example, the shape and arrangement of the light shielding portion 5 are not limited to the example illustrated in FIG. 1 and the like and can be appropriately changed according to the field angle determined by the display panel 21 and the optical element 22. For example, as illustrated in FIG. 15, the gradient of the main surface of the light shielding portion 5 may change as the distance from the center line C of the louver 23 increases.

Also, the shape of the light shielding portion 5 in a plan view is not limited to the plurality of concentric circles illustrated in FIG. 3B or the stripe shape illustrated in FIG. 3C. The shape in a plan view may be, for example, a plurality of concentric arcs, ellipses, or polygons having different diameters.

Furthermore, the method of image quality evaluation is not limited to the method of the above-described examples. For example, in a case where the image quality degradation caused by the display light being reflected on the main surface of the light shielding portion is evaluated, various charts such as a checkered pattern and a lattice pattern may be displayed on the display panel, and the in-plane uniformity, the contrast, the sharpness, and the like of the image may be performed by subjective evaluation by the observer.

In addition, in a case where image quality degradation due to external light or stray light reflected by the external light reflected on the main surface of the light shielding portion is evaluated, the LED may be switched between on and off in a state where black is displayed on the display panel, and comparison may be performed by subjective evaluation by the observer.

The louver according to the present disclosure may be provided in an optical device other than a head-mounted display. For example, the louver may be mounted on a casing that supports the louver in a device such as a handheld display, a camera that captures a still image or a moving image, a microscope, or an endoscope.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-205018, filed Dec. 22, 2022, which is hereby incorporated by reference herein in its entirety.

What is claimed is:

1. A plate-shaped louver comprising:

an incident surface on which light is incident from an optical element; and an emission surface, wherein the louver includes a plate-shaped base portion made of a light transmitting material and a light shielding portion arranged in contact with the light transmitting material inside the base portion, wherein the light shielding portion includes a first surface and a second surface, the second surface being a surface on a side close to an outer edge of the plate-shaped base portion among surfaces of the light shielding portion, the first surface being a surface on an opposite side of the second surface, wherein the light shielding portion includes an inclined portion in which the second surface is inclined with respect to the first surface, wherein a thickness of the inclined portion is configured to increase from a side of the incident surface toward a side of the emission surface, and wherein the first surface is a surface closer to an optical axis of the optical element than the second surface.

2. The louver according to claim 1, wherein the inclined portion is one of a plurality of inclined portions included in the light shielding portion.

3. The louver according to claim 1, wherein the light shielding portion includes a flat portion in which the second surface and the first surface are parallel on the side of the emission surface.

4. A head-mounted display comprising:

the louver according to claim 1;

a display panel; and the optical element, which is configured to direct display light output from the display panel to an eye of a user.

5. An optical device comprising:

the louver according to claim 1;

the optical element; and a casing that supports the louver.

6. A plate-shaped louver comprising:

an incident surface on which light is incident from an optical element; and an emission surface, wherein the louver includes a plate-shaped base portion made of a light transmitting material and a light shielding portion arranged in contact with the light transmitting material inside the base portion, wherein the light shielding portion includes a first surface and a second surface, the second surface being a surface on a side close to an outer edge of the plate-shaped base portion among surfaces of the light shielding portion, the first surface being a surface on an opposite side of the second surface, wherein the light shielding portion includes an inclined portion in which the second surface is inclined with respect to the first surface, wherein a thickness of the inclined portion is configured to increase from a side of the incident surface toward a side of the emission surface, and wherein a virtual extension line of the second surface in the inclined portion is configured to intersect an optical axis of the optical element on a side where the optical element is arranged with respect to the louver.

7. A plate-shaped louver comprising:

an incident surface on which light is incident from an optical element; and an emission surface, wherein the louver includes a plate-shaped base portion made of a light transmitting material and a light shielding portion arranged in contact with the light transmitting material inside the base portion, wherein the light shielding portion includes a first surface and a second surface, the second surface being a surface on a side close to an outer edge of the plate-shaped base portion among surfaces of the light shielding portion, the first surface being a surface on an opposite side of the second surface, wherein the light shielding portion includes an inclined portion in which the second surface is inclined with respect to the first surface, wherein a thickness of the inclined portion is configured to increase from a side of the incident surface toward a side of the emission surface, and wherein the first surface is a surface parallel to an optical axis of the optical element.

8. A plate-shaped louver comprising:

an incident surface on which light is incident from an optical element; and an emission surface, wherein the louver includes a plate-shaped base portion made of a light transmitting material and a light shielding portion arranged in contact with the light transmitting material inside the base portion, wherein the light shielding portion includes a first surface and a second surface, the second surface being a surface on a side close to an outer edge of the plate-shaped base portion among surfaces of the light shielding portion, the first surface being a surface on an opposite side of the second surface, wherein the light shielding portion includes an inclined portion in which the second surface is inclined with respect to the first surface, wherein a thickness of the inclined portion is configured to increase from a side of the incident surface toward a side of the emission surface, and wherein the second surface has a surface roughness Ra of 20 nm or less.

9. A plate-shaped louver comprising:

an incident surface on which light is incident from an optical element; and an emission surface, wherein the louver includes a plate-shaped base portion made of a light transmitting material and a light shielding portion arranged in contact with the light transmitting material inside the base portion, wherein the light shielding portion includes a first surface and a second surface, the second surface being a surface on a side close to an outer edge of the plate-shaped base portion among surfaces of the light shielding portion, the first surface being a surface on an opposite side of the second surface, wherein the light shielding portion includes an inclined portion in which the second surface is inclined with respect to the first surface, wherein a thickness of the inclined portion is configured to increase from a side of the incident surface toward a side of the emission surface, and wherein the light shielding portion has a length of 1 mm to 3 mm in a case of being viewed along a direction of an optical axis of the optical element, and a thickness of 0.1 μm to 45 μm in a case of being viewed along a direction orthogonal to the optical axis of the optical element.

10. A head-mounted display comprising:

a display unit configured to display an image;

an optical element configured to focus the image toward a position of an eye of a user; and a plate-shaped louver arranged between the optical element and the position of the eye of the user and including an incident surface on which light is incident from the optical element and an emission surface, wherein the louver includes a plate-shaped base portion made of a light transmitting material and a light shielding portion arranged in contact with the light transmitting material inside the base portion, wherein the light shielding portion includes a first surface and a second surface, the first surface being a surface on a side close to an optical axis of the optical element, the second surface being a surface on an opposite side of the first surface, wherein the light shielding portion includes an inclined portion in which the second surface is inclined with respect to the optical axis of the optical element, wherein a thickness of the inclined portion increases from a side of the incident surface toward a side of the emission surface, and wherein a virtual extension line of the second surface in the inclined portion is configured to intersect the optical axis of the optical element on a side where the optical element is arranged with respect to the louver.

11. The head-mounted display according to claim 10, wherein the inclined portion is one of a plurality of inclined portions included in the light shielding portion.

12. The head mounted head-mounted display according to claim 10, wherein the light shielding portion includes a flat portion in which the second surface and the first surface are parallel on the side of the emission surface.

13. A head-mounted display comprising:

a display unit configured to display an image;

an optical element configured to focus the image toward a position of an eye of a user; and a plate-shaped louver arranged between the optical element and the position of the eye of the user and including an incident surface on which light is incident from the optical element and an emission surface, wherein the louver includes a plate-shaped base portion made of a light transmitting material and a light shielding portion arranged in contact with the light transmitting material inside the base portion, wherein the light shielding portion includes a first surface and a second surface, the first surface being a surface on a side close to an optical axis of the optical element, the second surface being a surface on an opposite side of the first surface, wherein the light shielding portion includes an inclined portion in which the second surface is inclined with respect to the optical axis of the optical element, wherein a thickness of the inclined portion increases from a side of the incident surface toward a side of the emission surface, and wherein the first surface is a surface parallel to the optical axis of the optical element.

14. A head-mounted display comprising:

a display unit configured to display an image;

an optical element configured to focus the image toward a position of an eye of a user; and a plate-shaped louver arranged between the optical element and the position of the eye of the user and including an incident surface on which light is incident from the optical element and an emission surface, wherein the louver includes a plate-shaped base portion made of a light transmitting material and a light shielding portion arranged in contact with the light transmitting material inside the base portion, wherein the light shielding portion includes a first surface and a second surface, the first surface being a surface on a side close to an optical axis of the optical element, the second surface being a surface on an opposite side of the first surface, wherein the light shielding portion includes an inclined portion in which the second surface is inclined with respect to the optical axis of the optical element, wherein a thickness of the inclined portion increases from a side of the incident surface toward a side of the emission surface, and wherein the second surface has a surface roughness Ra of 20 nm or less.

15. A head-mounted display comprising:

a display unit configured to display an image;

an optical element configured to focus the image toward a position of an eye of a user; and a plate-shaped louver arranged between the optical element and the position of the eye of the user and including an incident surface on which light is incident from the optical element and an emission surface, wherein the louver includes a plate-shaped base portion made of a light transmitting material and a light shielding portion arranged in contact with the light transmitting material inside the base portion, wherein the light shielding portion includes a first surface and a second surface, the first surface being a surface on a side close to an optical axis of the optical element, the second surface being a surface on an opposite side of the first surface, wherein the light shielding portion includes an inclined portion in which the second surface is inclined with respect to the optical axis of the optical element, wherein a thickness of the inclined portion increases from a side of the incident surface toward a side of the emission surface, and wherein the light shielding portion has a length of 1 mm to 3 mm in a case of being viewed along a direction of the optical axis of the optical element, and a thickness of 0.1 μm to 45 μm in a case of being viewed along a direction orthogonal to the optical axis of the optical element.

* * * * *